United States Patent
Mueller et al.

(10) Patent No.: US 8,252,396 B2
(45) Date of Patent: Aug. 28, 2012

(54) EVOH BARRIER FILM WITH REDUCED AUTOCLAVE SHOCK

(75) Inventors: Walter B. Mueller, Inman, SC (US); Patrick W. Thompson, Greenville, SC (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 13/234,803

(22) Filed: Sep. 16, 2011

(65) Prior Publication Data

US 2012/0000166 A1 Jan. 5, 2012

Related U.S. Application Data

(62) Division of application No. 12/214,991, filed on Jun. 24, 2008, now Pat. No. 8,075,964.

(51) Int. Cl.
| | |
|---|---|
| B32B 27/08 | (2006.01) |
| B32B 27/30 | (2006.01) |
| B32B 27/32 | (2006.01) |
| B32B 27/34 | (2006.01) |
| B65B 25/06 | (2006.01) |
| B65B 9/00 | (2006.01) |
| B65B 43/26 | (2006.01) |
| B65B 1/04 | (2006.01) |
| B65B 3/04 | (2006.01) |
| B65B 5/00 | (2006.01) |

(52) U.S. Cl. ........... 428/35.4; 426/410; 53/459; 53/469; 53/284.7

(58) Field of Classification Search ................. 428/34.1, 428/34.8, 35.2, 35.4, 35.7, 36.6, 36.7, 411.1, 428/474.4, 474.9, 475.5, 475.8, 476.1, 476.3, 476.9, 500, 515–523; 426/106, 127–130, 426/392, 410; 53/459, 469, 284.7
See application file for complete search history.

(56) References Cited

U.S. PATENT DOCUMENTS

| | | |
|---|---|---|
| 4,355,721 A | 10/1982 | Knott et al. |
| 4,753,700 A | 6/1988 | Fant |
| 4,755,419 A | 7/1988 | Shah |
| 5,069,946 A | 12/1991 | Moritani et al. |
| 5,741,566 A | 4/1998 | Hogstrom et al. |
| 6,004,660 A | 12/1999 | Topolski et al. |
| 6,942,927 B2 | 9/2005 | Shepard et al. |
| 2004/0037983 A1 | 2/2004 | Reighard et al. |

FOREIGN PATENT DOCUMENTS

| | | |
|---|---|---|
| JP | 2001009976 A1 | 1/2001 |
| WO | 2003082568 A1 | 10/2003 |
| WO | 20040080805 | 9/2004 |
| WO | 2006094733 A | 9/2006 |

*Primary Examiner* — Walter B Aughenbaugh
(74) *Attorney, Agent, or Firm* — Ashley D. Wilson

(57) ABSTRACT

The presently disclosed subject matter is directed to a barrier film that maintains an oxygen barrier after being subjected to autoclaving conditions. The film comprises one EVOH layer positioned as a core layer, and one EVOH layer positioned directly adjacent to an outer layer comprising highly permeable material having a moisture vapor permeability greater than about 40 g-mil/100 in²-day-atm. During autoclaving, the barrier properties of the EVOH layer positioned adjacent to the outer layer allows improved recovery of oxygen barrier properties. In addition, during rewetting applications, the internal EVOH layer maintains the oxygen barrier. Also disclosed are methods of making and using the disclosed barrier film.

8 Claims, 2 Drawing Sheets

EVOH BARRIER FILM WITH REDUCED AUTOCLAVE SHOCK

CROSS REFERENCE TO RELATED APPLICATIONS

This application is a divisional application under 35 U.S.C. §120-121 of U.S. patent application Ser. No. 12/214,991, filed Jun. 24, 2008 for "EVOH BARRIER FILM WITH REDUCED AUTOCLAVE SHOCK", now U.S. Pat. No. 8,075,964, which is incorporated by reference herein in its entirety.

FIELD OF THE INVENTION

The presently disclosed subject matter relates to thermoplastic films that can be used to make packages for a wide variety of medical and food applications.

BACKGROUND

Currently, it is common practice to supply medical solutions for parenteral (e.g., intravenous) administration in the form of disposable, flexible pouches. Such medical solutions can include, for example, parenteral, enteral, dialysis solutions, nutrients, and pharmacologic agents, including gene therapy and chemotherapy agents. The pouches should meet a number of performance criteria, including collapsibility, optical clarity and transparency, high-temperature heat-resistance, and sufficient mechanical strength to withstand the rigors of the use environment. Medical solution pouches should also provide a sufficient barrier to the passage of oxygen and other gases to prevent contamination of the solution contained therein.

In addition, there are a number of factors that can limit the ability to store at least certain medical solutions. For example, due to stability, compatibility or other concerns, a number of medical solutions cannot be premixed. Rather, the individual components must be stored separately. Typically these components are either stored in separate containers and admixed before use, or are stored in separate compartments of a single flexible container and mixed prior to use. For example, amino acids and dextrose solutions require storage in separate containers or compartments before use.

Typically, prior to administering a medical solution from a pouch and into a patient, a medical professional visually inspects the solution contained within the pouch. Such an inspection provides a cursory determination that the medical solution to be administered is of the proper type and has not deteriorated or become contaminated. In this regard, it is advantageous that the pouch have excellent optical properties, i.e., a high degree of clarity and transmission and a low degree of haze. A medical solution pouch having poor optical properties can render a visual inspection of the packaged solution ineffective, thereby triggering the medical professional to needlessly discard the pouch. Also, the medical professional could fail to notice a solution that is of the wrong type, or that had deteriorated or become contaminated. As will be discussed herein below, the industry-wide practice of heat-sterilizing solution-containing medical pouches greatly exacerbates the problem of maintaining good optical properties in such pouches.

Heat-sterilization of medical pouches typically occurs in an autoclave at about 250° F. for periods of about 15 to 30 minutes. Steam is generally used as the heat-transfer medium. Heat-sterilization is normally performed by the manufacturer and/or packager of the medical solution prior to sending the packaged medical solution to the end user. Heat sterilization is done to help ensure that the medical solution as packaged in the pouch is substantially free from contamination. Thus, another requirement of medical solution pouches is that they must be able to endure the high temperatures encountered during heat-sterilization without deterioration by, e.g., developing a heat-seal leak or other type of containment failure.

Medical solution pouches should also have sufficient mechanical strength to withstand the abuse that is typically encountered in the use environment. For example, in some circumstances, a plastic or rubber bladder is placed around a medical solution-containing pouch and pressurized to force the solution out of the pouch and into a patient. Such a bladder is commonly referred to as a "pressure-cuff" and is used, for example, when a patient is bleeding profusely in order to quickly replace lost fluids. Medical solution pouches should have sufficient durability to remain leak-free during such procedures.

Flexible pouches can be made from an ethylene vinyl alcohol copolymer (EVOH). However, EVOH can exhibit various undesirable properties when used as a medical solution pouch. Typically, when prior art films containing EVOH are subjected to autoclave conditions, the increased temperature, moisture, and pressure results in loss and/or degradation of the EVOH barrier function. Similarly, when prior art films containing EVOH are subjected to rewetting or high relative humidity conditions, as would be experienced during an accidental package leakage, etc., exposure to moisture typically results in loss or degradation of the EVOH barrier function. While the loss or degradation of barrier function in the above situations can be temporary, significant amounts of one or more gases (e.g., oxygen) can nonetheless penetrate the film. In medical, food, and other such applications, such loss or degradation of film barrier functions can result in contamination of the products packaged therein.

It would thus be desirable to provide a pouch comprising EVOH that provides the collapsibility, optical clarity, sterilization, premixing, and strength properties advantageous in medical and related applications.

SUMMARY

In some embodiments, the presently disclosed subject matter is directed to a multilayer barrier film comprising: (a) a first layer comprising a polymeric material having a moisture vapor permeability greater than about 40 g-mil/100 in$^2$-day-atm; (b) a second layer directly adjacent to the first layer comprising EVOH; (c) a first region defining a third layer comprising from 1 to 5 distinct sublayers comprising a polymeric material, the third layer having moisture vapor permeability of less than about 20 g-mil/100 in$^2$-day-atm; (d) a fourth layer comprising EVOH; and (e) a second region defining a fifth layer comprising about 1 to 5 sublayers comprising a polymeric material, the fifth layer having a moisture vapor transmission rate of less than about 5 g/100 in$^2$-day-atm. As would be readily appreciated by one of ordinary skill in the art, the second layer can be disposed between the first and third layers. Similarly, the third layer can be disposed between the second and fourth layers. The fourth layer can be disposed between the third and fifth layers.

In some embodiments, the presently disclosed subject matter is directed to a method of reducing the loss of oxygen barrier in a package subjected to at least one hour of autoclave conditions, the method comprising first packaging a product in a film, the film comprising: (a) a first layer comprising a highly permeable material having a moisture vapor permeability greater than about 40 g-mil/100 in$^2$-day-atm; (b) a second layer directly adjacent to the first layer comprising EVOH; (c) a first region defining a third layer comprising about 1 to 5 distinct sublayers comprising low permeable materials having moisture vapor permeability of less than about 20 g-mil/100 in$^2$-day-atm; (d) a fourth layer comprising EVOH; and (e) a second region defining a fifth layer comprising about 1 to 5 sublayers comprising very low permeable materials having a moisture vapor transmission rate of less than about 5 g/100 in$^2$-day-atm. The film is then formed into a pouch, and the pouch filled with said product. The pouch is then sealed to form a sealed pouch containing said product. The packaged product is then subjected to autoclave conditions, wherein the package exhibits an oxygen transmission rate after at least one hour after autoclaving selected from the group consisting of: about 0 to 10 cc/m$^2$-atm-day, about 0 to 5 cc/m$^2$-atm-day, and about 0 to 2 cc/m$^2$-atm-day.

In some embodiments, the presently disclosed subject matter is directed to a package comprising a product and a pouch containing the product. In some embodiments, the pouch is constructed from a film comprising: (a) a first layer comprising a highly permeable material having a moisture vapor permeability greater than about 40 g-mil/100 in$^2$-day-atm; (b) a second layer directly adjacent to the first layer comprising EVOH; (c) a first region defining a third layer comprising about 1 to 5 distinct sublayers comprising low permeable materials having moisture vapor permeability of less than about 20 g-mil/100 in$^2$-day-atm; (d) a fourth layer comprising EVOH; and (e) a second region defining a fifth layer comprising about 1 to 5 sublayers comprising very low permeable materials having a moisture vapor transmission rate of less than about 5 g/100 in$^2$-day-atm.

In some embodiments, the presently disclosed subject matter is directed to a package comprising (a) a first pouch containing a product; and (b) a second pouch containing the first pouch and the product. In some embodiments, the second pouch containing the first pouch and product is constructed from a film comprising: (a) a first layer comprising a highly permeable material having a moisture vapor permeability greater than about 40 g-mil/100 in$^2$-day-atm; (b) a second layer directly adjacent to the first layer comprising EVOH; (c) a first region defining a third layer comprising about 1 to 5 distinct sublayers comprising low permeable materials having moisture vapor permeability of less than about 20 g-mil/ 100 in$^2$-day-atm; (d) a fourth layer comprising EVOH; and (e) a second region defining a fifth layer comprising about 1 to 5 sublayers comprising very low permeable materials having a moisture vapor transmission rate of less than about 5 g/100 in$^2$-day-atm.

An object of the presently disclosed subject matter having been stated hereinabove, other objects and advantages will become apparent to those of ordinary skill in the art after a study of the following description and non-limiting examples.

DETAILED DESCRIPTION

I. General Considerations

Figure 1:
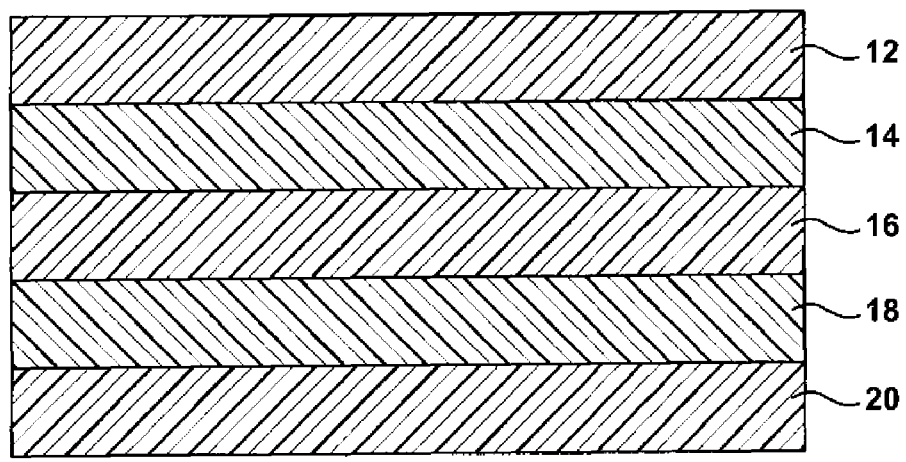
FIG. 1 is a cross-sectional view of a 5-layer film of the presently disclosed subject matter.

The presently disclosed subject matter relates generally to packages useful for packaging a wide variety of products, including (but not limited to) medical products, food products, and other like products. More specifically, the presently disclosed subject matter relates to packages made from multilayer structures useful for food, autoclave, overwrap, and other like packaging applications. The packages are made from multilayer structures that have sufficient optical clarity and transparency, high-temperature heat-resistance, and mechanical strength for their intended use.

The disclosed packages are formed from packaging films comprising EVOH, the films suitable for autoclave applications substantially without the deleterious effects exhibited in prior art EVOH-containing films. When prior art films containing EVOH are subjected to autoclave conditions, the increased temperature, moisture, and pressure typically results in loss or degradation of the EVOH barrier functions. Similarly, when prior art films containing EVOH are subjected to rewetting conditions, as would be experienced during an accidental package leakage, etc., exposure to moisture results in loss of EVOH barrier function. While the loss of barrier function in the above situations can be temporary, significant amounts of one or more gases (e.g., oxygen) can nonetheless penetrate the film. In medical, food, and other such applications, such loss of film barrier functions can degrade the products packaged therein.

The presently disclosed film comprises two EVOH layers. Specifically, the disclosed film comprises a first EVOH layer in direct contact with an outer layer comprising a highly permeable material. Thus, the disclosed film comprises a first layer comprising a highly permeable material, and a second layer comprising EVOH directly adjacent to the first layer. Continuing, the film further comprises a first region defining a third layer comprising about 1 to 5 distinct sublayers comprising low permeable materials. The third layer as a whole has moisture vapor permeability of less than about 20 g-mil/ 100 in$^2$-day-atm. The fourth layer comprises a core layer of EVOH. The fifth layer comprises a second region comprising about 1 to 5 sublayers comprising very low permeable materials. The fifth layer as a whole has a moisture vapor transmission rate of less than about 5 g/100 in$^2$-day-atm.

Thus, during autoclave applications, the EVOH layer positioned directly adjacent to the first layer comprising the highly permeable material has been found to recover barrier properties quickly, compared to EVOH-containing prior art films. In addition, during accidental rewetting situations or exposure to high relative humidity, the core EVOH layer in between the third and fifth layers maintains the barrier and is not as sensitive to environmental fluctuations as the EVOH layer positioned adjacent to the first layer. Accordingly, the presently disclosed film exhibits favorable characteristics improved during autoclaving conditions, as well as favorable characteristics during rewetting conditions.

II. Definitions

While the following terms are believed to be understood by one of ordinary skill in the art, the following definitions are set forth to facilitate explanation of the presently disclosed subject matter.

Unless defined otherwise, all technical and scientific terms used herein have the same meaning as commonly understood by one of ordinary skill in the art to which the presently disclosed subject matter pertains. Although any methods, devices, and materials similar or equivalent to those described herein can be used in the practice or testing of the presently disclosed subject matter, representative methods, device, and materials are now described.

Following long-standing patent law convention, the terms "a", "an", and "the" refers to "one or more" when used in the subject specification, including the claims. Thus, for example, reference to "a film" (e.g., "a packaging film") includes a plurality of such films, and so forth.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, or percentage can encompass variations of, in some embodiments ±20%, in some embodiments ±10%, in some embodiments ±5%, in some embodiments ±1%, in some embodiments ±0.5%, and in some embodiments to ±0.1%, from the specified amount, as such variations are appropriate in the disclosed package and methods.

As used herein, the term "abuse layer" refers to an outermost film layer and/or an innermost film layer, so long as the film layer serves to resist abrasion, puncture, or other potential causes of reduction of package integrity or package appearance quality. In some embodiments, abuse layers can comprise any polymer, so long as the polymer contributes to achieving an integrity goal and/or an appearance goal.

As used herein, the term "adhesive" refers to polymeric adhesive. In some embodiments, the polymeric adhesive can be an olefin polymer or copolymer with an anhydride functionality grafted thereon and/or copolymerized therewith and/or blended therewith. However, any of a variety of commonly used adhesives can be used.

As used herein, the term "adjacent", as applied to film layers, refers to the positioning of two layers of the film either in contact with one another without any intervening layer or with a tie layer, adhesive, or other layer therebetween. The term "directly adjacent" refers to adjacent layers that are in contact with another layer without any tie layer, adhesive, or other layer therebetween.

As used herein, the term "autoclavable" refers to a film comprising EVOH that can be formed into a pouch, filled with an oxygen sensitive product, sealed, and subjected to sterilizing conditions of high temperature (between about 250° F. and 300° F.) for a period of time between 10 minutes and 60 minutes, in the presence of water, steam, and/or pressurized steam, without delamination of the EVOH layer from the adjacent layers of the film, or voiding of the EVOH and subsequent barrier loss. Typical autoclave conditions can be about 253° F. for about 30 minutes.

As used herein, the term "bag" refers to a container made from one or more plies of a flexible material, closed at least at one end. It can include, but is not limited to, pouches of any size or shape.

As used herein, the term "barrier" and/or the phrase "barrier layer", as applied to films and/or layers of the disclosed package, are used with reference to the ability of a film or layer to serve as a barrier to one or more gases. In the packaging art, barrier layers can include, but are not limited to, ethylene/vinyl alcohol copolymer, polyvinylidene chloride, polyalkylene carbonate, polyamide, polyethylene naphthalate, polyester, polyacrylonitrile, and combinations thereof, as known to those of skill in the art. As set forth in more detail herein below, the barrier layer preferably comprises EVOH.

As used herein, the term "core layer" refers to the central layer or layers of a multilayered film.

The term "directly adjacent" as used herein refers to adjacent layers that are in contact with another layer without any tie layer, adhesive, or other layer therebetween.

As used herein, the term "elastomeric copolyamide" refers to aliphatic polyamides that contain both rigid and elastomeric components. The elastomeric components can include (but are not limited to) carboxy or amine terminated units of butadiene, styrene-butadiene copolymer, neoprene, nitrile rubbers, butyl rubbers, polyisoprenes, ethylene-propylene terpolymers, silicone rubbers, or polyurethanes.

As used herein, the term "ethylene/alpha-olefin copolymer" or "EAO" refers to copolymers of ethylene with one or more comonomers selected from $C_4$ to $C_{10}$ alpha-olefins such as butene-1 (i.e., 1-butene), hexene-1, octene-1, etc. in which the molecules of the copolymers comprise long chains with relatively few side chain branches or cross-linked structures. The molecular structure is to be contrasted with conventional low or medium density polyethylenes that are more highly branched than their respective counterparts. EAO includes such heterogeneous materials as linear medium density polyethylene (LMDPE), linear low density polyethylene (LLDPE), and very low and ultra low density polyethylene (VLDPE and ULDPE); as well as homogeneous polymers (HEAO) such as TAFMER™ ethylene/alpha olefin copolymers supplied by Mitsui Petrochemical Corporation and metallocene-catalyzed polymers such as EXACT™ resins supplied by Exxon and AFFINITY™ resins supplied by the Dow Chemical Company. EAO includes long chain branched homogeneous ethylene/alpha-olefin copolymer. An EAO can for example, have a density of between 0.916 and 0.945 grams/cc.

As used herein, the term "fifth layer" refers to the fact that at least one layer of the multilayer film comprises a region comprising about 1 to 5 sublayers comprising very low permeable materials having a moisture vapor transmission rate of less than about 5 g/100 in$^2$-day-atm. In some embodiments, the phrase "a fifth layer" is not intended to indicate any specific location of the fifth layer relative to the other layers of the film, or any manner in which the film can be built up. Rather, this phrase is included merely to provide a convenient method of identifying layers that differ in chemical composition.

As used herein, the term "film" can be used in a generic sense to include plastic web, regardless of whether it is film or sheet.

As used herein, the term "first layer" refers to the fact that at least one layer of the multilayer film comprises a highly permeable material having a moisture vapor permeability greater than about 40 g-mil/100 in$^2$-day-atm. In some embodiments, the phrase "a first layer" is not intended to indicate any specific location of the first layer relative to the other layers of the film, or any manner in which the film can be built up. Rather, this phrase is included merely to provide a convenient method of identifying layers that differ in chemical composition.

The term "a fourth layer" as used herein refers to the fact that at least one layer of the multilayer film comprises EVOH. In some embodiments, the phrase "a fourth layer" is not intended to indicate any specific location of the fourth layer relative to the other layers of the film, or any manner in which the film can be built up. Rather, this phrase is included merely to provide a convenient method of identifying layers that differ in chemical composition.

As used herein, the term "frangible" can indicate the susceptibility of being broken without implying weakness. Thus, in referring to a frangible seal separating compartments of a pouch, it can be meant that when so sealed the compartments are united together in a fluid impervious manner, and when the seal is broken or severed the contents of the compartments are free to intermix. Thus, the frangible seal in an intact state serves to maintain the integrity of a product chamber reservoir for maintaining fluid, semi-fluid, and/or solid products therein, but in a broken or severed state allows for passage of these products along a delaminated seal area. Frangible seals are commonly referred to as "easy open seals", "peelable seals" and/or other similar descriptors by those of ordinary skill in the related art.

"High density polyethylene" as used herein has a density of 0.94 grams per cubic centimeter to 0.96 grams per cubic centimeter.

As used herein, the term "high permeable material" refers to a polymer having moisture vapor permeability of greater than about 40 g-mil/100 in$^2$-day-atm.

As used herein, the term "intermediate" refers to a layer of a multilayer film that is between an outer layer and core layer of the film.

As used herein, the term "layer" refers to the thickness of material formed over a surface and extending generally parallel to the surface, with one side toward the surface and another side away from the surface. A layer can include two or more layers within it, referred to as "sublayers."

"Linear low density polyethylene" as used herein has a density in the range of 0.916 to 0.925 grams per cubic centimeter.

"Linear medium density polyethylene" as used herein has a density of about 0.926 grams per cubic centimeter to 0.939 grams per cubic centimeter.

As used herein, the term "low permeable material" refers to a polymer having moisture vapor permeability of less than about 20 g-mil/100 in$^2$-day-atm.

"Medical product" and the like herein refers to any product that is sterilized prior to use in health care, whether for medical, dental, or veterinary applications, such as those used during medical intervention. Such product can include (but are not limited to) needles, syringes, sutures, wound dressings such as bandages, general wound dressings, non-adherent dressings, burn dressings, surgical tools such as scalpels, gloves, drapes, and other disposal items, solutions, ointments, antibiotics, antiviral agents, blood components such as plasma, drugs, biological agents, intravenous solutions, saline solutions, surgical implants, surgical sutures, stents, catheters, vascular grafts, artificial organs, cannulas, wound care devices, dialysis shunts, wound drain tubes, skin sutures, vascular grafts, implantable meshes, intraocular devices, heart valves, biological graft materials, tape closures and dressings, head coverings, shoe coverings, sterilization wraps, and the like.

As used herein, the term "moisture vapor permeability" refers to the amount of moisture vapor that can pass though a specified amount of a substance (such as, e.g., a film) in a specified period of time, usually expressed in units of g-mil/in$^2$-day-atm.

As used herein, the term "moisture vapor transmission rate" refers to the rate at which water passes through a polymer film. As used herein, moisture vapor transmission rate is measured according to ASTM-F1492.

As used herein, the term "oxygen transmission rate" refers to the rate of oxygen gas passing through an entire film structure.

As used herein, the term "polyamide" refers to both polyamides and copolyamides, and means a polymer in which amide linkages (—CONH—) occur along the molecular chain. Examples can include, but are not limited to, nylon 6, nylon 11, nylon 12, nylon 66, nylon 69, nylon 610, nylon 612, nylon 6/66, and amorphous polyamide.

As used herein, the term "polyether polyamide block copolymer" refers to copolymers of polyamides or copolyamides and amine or carboxy terminated polyethers. Examples of polyamides and copolyamides can include, but are not limited to, nylon 6, nylon 11, nylon 12, nylon 66, nylon 69, nylon 610, nylon 612, nylon 6/66, nylon 66/610, nylon 6/69, and nylon 6/12. Examples of polyethers can include, but are not limited to, a series of products sold by Huntsman Chemical Company (Melbourne, Australia) under the tradename Jeffamine® Diamines.

As used herein, the term "polymer" refers to the product of a polymerization reaction, and can be inclusive of homopolymers, copolymers, terpolymers, etc. In some embodiments, the layers of a film can consist essentially of a single polymer, or can have still additional polymers together therewith, i.e., blended therewith.

As used herein, the term "seal" refers to any bond of a first region of an outer film surface to a second region of an outer film surface, including heat or any type of adhesive material, thermal or otherwise. In some embodiments, the seal is formed by heating the regions to at least their respective seal initiation temperatures. The sealing can be performed by any one or more of a wide variety of means, such as, but not limited to, using a heat seal technique (e.g., melt-bead sealing, thermal sealing, impulse sealing, dielectric sealing, radio frequency sealing, ultrasonic sealing, hot air, hot wire, infrared radiation, and the like).

As used herein, the phrases "seal layer", "sealing layer", "heat seal layer", and "sealant layer" refers to an outer layer or layers involved in the sealing of a film to itself, another layer of the same or another film, and/or another article that is not a film. In general, sealant layers employed in the packaging art have included the genus of thermoplastic polymers, including (but not limited to) thermoplastic polyolefin, polyamide, polyester, polyvinyl chloride, homogeneous ethylene/alpha-olefin copolymer, polypropylene, polypropylene copolymer, ethylene/vinyl acetate copolymer, and ionomer.

As used herein, the term "second layer" refers to the fact that at least one layer of the multilayer film in direct contact with the first layer comprises EVOH. In some embodiments, the phrase "a second layer" is not intended to indicate any specific location of the second layer relative to the other layers of the film, or any manner in which the film can be built up. Rather, this phrase is included merely to provide a convenient method of identifying layers that differ in chemical composition.

As used herein, the term "sublayer" refers to the thinnest unit of a film layer that contains all the ingredient of the film layer as a whole. As used herein, a sublayer merely describes the manner in which the layers are grouped together.

The term "third layer" as used herein refers to the fact that at least one layer of the multilayer film comprises a first region defining a third layer comprising about 1 to 5 distinct sublayers comprising low permeable materials having moisture vapor permeability of less than about 20 g-mil/100 in$^2$-day-atm. In some embodiments, the phrase "a third layer" is not intended to indicate any specific location of the third layer relative to the other layers of the film, or any manner in which the film can be built up. Rather, this phrase is included merely to provide a convenient method of identifying layers that differ in chemical composition.

As used herein, the term "tie layer" refers to any internal film layer having the primary purpose of adhering two layers to one another. In some embodiments, tie layers can comprise any nonpolar polymer having a polar group grafted thereon, so that the polymer is capable of covalent bonding to polar polymers, such as polyamide and ethylene/vinyl alcohol copolymer. In some embodiments, tie layers can comprise at least one member of the group including, but not limited to, modified polyolefin, modified ethylene/vinyl acetate copolymer, anhydride grafted ethylene/methyl acrylate copolymer, homogeneous ethylene/alpha-olefin copolymer, and combinations thereof. In some embodiments, tie layers can comprise at least one member selected from the group including, but not limited to, anhydride modified grafted linear low density polyethylene, anhydride grafted low density polyethylene, homogeneous ethylene/alpha-olefin copolymer, anhydride grafted ethylene/methyl acrylate copolymer, and/or anhydride grafted ethylene/vinyl acetate copolymer.

As used herein, the term "very low permeable material" refers to polymer having moisture vapor transmission rate of less than about 5 g/100 in$^2$-day-atm.

All compositional percentages used herein are presented on a "by weight" basis unless designated otherwise.

III. The Barrier Film

III.A. Generally

As discussed herein above, the presently disclosed subject matter provides a multilayer barrier film comprising: (a) a first layer comprising a highly permeable material having a moisture vapor permeability greater than about 40 g-mil/100 in$^2$-day-atm; (b) a second layer directly adjacent to the first layer comprising EVOH; (c) a first region defining a third layer comprising about 1 to 5 distinct sublayers comprising low permeable materials having moisture vapor permeability of less than about 20 g-mil/100 in$^2$-day-atm; (d) a fourth layer comprising EVOH; and (e) a second region defining a fifth layer comprising about 1 to 5 sublayers comprising very low permeable materials having a moisture vapor transmission rate of less than about 5 g/100 in$^2$-day-atm.

Thus, the disclosed barrier film comprises two EVOH layers; one layer positioned as a core layer and one layer positioned directly adjacent to an outer layer. It is believed that during autoclaving, the barrier properties of the EVOH layer positioned adjacent to the outer layer, although degraded temporarily, recover quickly compared to prior art films containing EVOH layers. In addition, during accidental rewetting situations, the core EVOH layer maintains its barrier properties and is not as sensitive to environmental fluctuations as prior art films. Thus, in comparison to prior art EVOH-containing films, the disclosed packaging film does not exhibit unfavorable characteristics as a result of exposure to autoclave conditions, such as whitening or undesirable film appearance. In addition, the disclosed film maintains a high gas barrier property inherent to EVOH during autoclave and accidental rewetting conditions.

FIG. 1 illustrates a five-layer film 10 that is suitable for forming a flexible pouch for a wide variety of applications. For example, the film can be used for packaging and administering medical solutions, such as (but not limited to) saline solution, dextrose solution, and solutions for dialysis applications. As can be appreciated by those having ordinary skill in the art, multilayer films within the scope of the presently disclosed subject matter are not limited to the five-layer structure depicted in FIG. 1. Rather, films having a greater number of layers than that shown can be included.

The most basic film construction of the disclosed film can include: highly moisture permeable material/EVOH/low moisture permeable material/EVOH/very low moisture permeable material. The exemplary 5-layer film is illustrated in FIG. 1 (not drawn to scale), in which film 10 has first layer 12 that comprises a highly moisture permeable material; second layer 14 comprising an EVOH layer; third layer 16 that comprises about 1 to 5 sublayers, each sublayer comprising one or more low moisture permeable materials; fourth layer 18 comprising an EVOH layer; and fifth layer 20 that that comprises about 1 to 5 sublayers, each sublayer comprising one or more very low moisture permeable materials.

Figure 2:
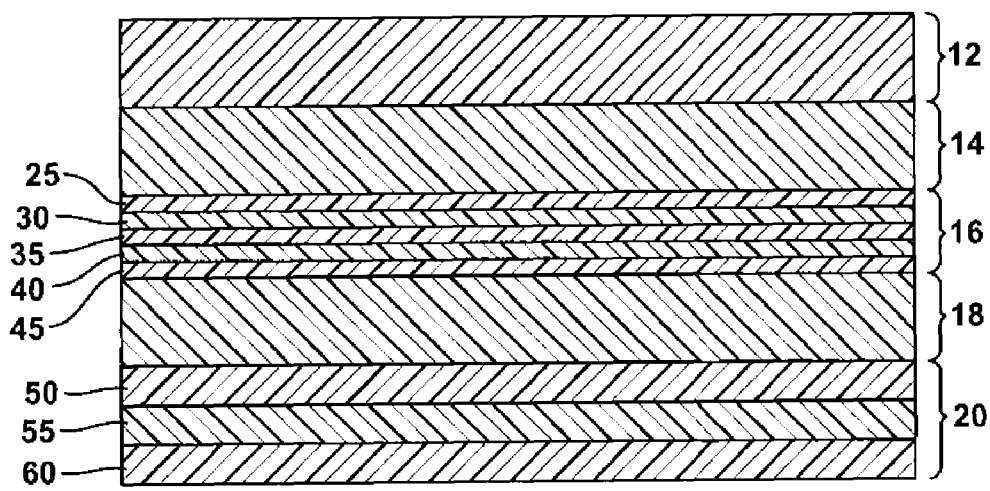
FIG. 2 is a cross-sectional view of another embodiment of a 5-layer film of the presently disclosed subject matter.

FIG. 2 illustrates in another embodiment a film 11 like the film of FIG. 1, but wherein the third layer (layer 16) comprises 5 sublayers, 25, 30, 35, 40, and 45 and wherein the fifth layer (layer 20) comprises 3 sublayers, 50, 55, and 60. One of ordinary skill in the art would readily understand that the third and fifth layers can each comprise anywhere from 1 to 5 sublayers.

In some embodiments, the disclosed film desirably exhibits an oxygen transmission rate (OTR) after at least one hour after autoclaving of about 0 to 10 cc/m$^2$/atm/day; in some embodiments, about 0 to 5 cc/m$^2$/atm/day; and in some embodiments, about 0 to 2 cc/m$^2$/atm/day. OTR refers to the rate of oxygen gas passing through an entire film structure and can be measured according to ASTM D-3985-81. Typical autoclave conditions can include sterilizing conditions of high temperatures (between about 250° F. and 300° F.) for a period of time between 10 minutes and 60 minutes in the presence of water, steam, and/or pressurized steam.

III.B. Outside Layer

A suitable polymeric material for the outside layer of the film is a highly moisture permeable material having a moisture vapor permeability greater than about 40 g-mil/100 in$^2$-day-atm. Suitable highly permeable materials can include, but are not limited to, polyamide, elastomeric copolyamide, polyether polyamide block copolymer, and combinations thereof. Such highly permeable materials are sufficiently permeable to permit the escape of moisture from the adjacent EVOH barrier layer to the exterior environment outside the package to restore the barrier property of the package. In addition, the highly permeable materials are sufficiently waterproof to assist in preventing harm to the barrier property of the adjacent EVOH layer during the severe conditions of the autoclave cycle. Thus, it has been unexpectedly discovered that such highly permeable materials have a major effect in suppressing the sensitivity of EVOH to water, particularly in preventing whitening and the generation of wavy or striped patterns in the disclosed film.

Polyamide is tough, flexible, and not greatly affected by heat or cold. In addition, polyamide is resistant to abrasion, is transparent, and can be printed upon for label purposes. Polyamide is not excessively expensive and has adequate adhesion to EVOH, such that polyamide and EVOH can be positioned in adjacent film layers without the need for an adhesive or tie layer there between. Accordingly, polyamide has several attributes that are desirable in a multilayer film where the polyamide layer is an outside surface layer having a moisture vapor permeability greater than about 40 g-mil/100 in$^2$-day-atm, overlying an EVOH barrier layer.

Generally, the outer polyamide layer can be any polyamide or blends of polyamides. For example, polyamide resins suitable for the outer layer of the film can include, but are not limited to, polycaprolactam (nylon-6); nylon-7; nylon-9; nylon-11; nylon-12; nylon-2,6; nylon-4,6; nylon-6,6; nylon-6,10; nylon-6, 12; nylon-8, 6; nylon-10, 6; nylon-12, 8; nylon-6/12; nylon-6/9, 6/6, 6; nylon-12/6,6; nylon-6, 6/6,10; nylon-2, 6/6,6; nylon-6/6, 6/6, 10; and blends of any of the above, in any suitable proportions of each blend component. Specifically, grades of Grilon™ Grivory™ and Grilflex™ nylon (available from EMS-CHEMIE, Inc., Sumter, S.C., United States of America), Novamid™ 1030 (available from Mitsubishi Chemical USA, Inc., White Plains, N.Y., United States of America), and blends thereof can be used. Minor amounts of polymers and additives compatible with polyamide can also be included in the outer layer of the disclosed film.

Elastomeric copolyamides are aliphatic polyamides that contain both rigid and elastomeric components. Generally speaking, the outer elastomeric copolyamide layer can be any elastomeric copolyamide or blends thereof. For example, the elastomeric copolyamide can include, but is not limited to, copolymers of a polyamide and a polyetheramine, copolymers of nylon 12 and a polyetheramine, and copolymers of nylon 69 and a polyetheramine.

Polyether polyamide block copolymer is a copolymer of an aliphatic polyamide or copolyamide and an amine or carboxy terminated polyether. Examples of polyamides and copolyamides can include, but are not limited to, nylon 6, nylon 11, nylon 12, nylon 66, nylon 69, nylon 610, nylon 612, nylon 6/66, nylon 66/610, nylon 6/69, and nylon 6/12. Examples of polyethers can include, but are not limited to, a series of products sold by Huntsman Chemical Company (Melbourne, Australia) under the tradename Jeffamine® Diamines.

III.C. EVOH Barrier Layers

The barrier layers of the disclosed film must provide a sufficient barrier to gases to provide adequate shelf-life for the product packaged in the film. Ethylene-vinyl alcohol copolymer (EVOH) provides superior oxygen impermeability when compared with other polymeric materials, such as saran and acrylonitrile that have been employed in packages for barrier qualities. However, as set forth herein above, the barrier quality of EVOH is adversely affected by the increased temperatures, moisture, and pressures resulting from autoclave conditions. In addition, the barrier properties of EVOH are further decreased as a result of exposure to moisture and high relative humidities, such as those that can occur in accidental rewetting situations (e.g., rain, package leaks, and the like).

EVOH is a copolymer consisting essentially of ethylene and vinyl alcohol recurring structural units and can contain small amounts of other monomer units, in particular of vinyl ester units. These copolymers can be prepared by saponification or partial or complete alcoholysis of ethylene-vinyl ester copolymers. Among such vinyl esters, vinyl acetate is the preferred monomer. The degree of saponification or of alcoholysis is at least 90 mol % and can range from 94% to 99.5%. In some embodiments, the molar proportion of ethylene in the EVOH can range from 3 mol % to 75 mol %; in some embodiments, from 10 mol % to 50 mol %; in some embodiments, between about 24 mol % and about 52 mol %; and in some embodiments, from about 28 mol % to about 48 mol %. However, greater or lesser amounts of ethylene content are also envisioned and can be included within the scope of the presently disclosed subject matter.

As set forth above, the outer layer of the disclosed film comprises at least one highly permeable material having a moisture vapor permeability greater than about 40 g-mil/100 in$^2$-day-atm. Directly adjacent to the outer film layer is a layer comprising an EVOH copolymer that will not delaminate from either adjacent layer after the film has been exposed to autoclave conditions. Such conditions are generally between about 250° F. and 450° F., for between 10 minutes and 60 minutes, in the presence of water, steam, and/or pressurized steam. Exemplary EVOH resins can include, but are not limited to, XEP-334™ (available from Evalca, Livonia, Mich., United States of America) and SG372B™ (available from Soarus, a subsidiary of Nippon Gohsei of Japan). However, any of a wide variety of EVOH resins not listed herein can also be used in accordance with the presently disclosed subject matter.

Continuing, a core layer of the disclosed film (or, in some embodiments, the fourth layer of a 5-layer film) can be an EVOH barrier layer to provide protection from gases (such as, for example, oxygen) that can deleteriously affect sensitive products contained within packages prepared by the film. Thus, the core layer of the disclosed film also comprises an EVOH. As is well known, the barrier quality of EVOH is adversely affected by the presence of moisture or high relative humdity. A small quantity of water will raise the moisture content of a layer of EVOH to an extent where the barrier quality of the layer is severely affected. The barrier quality of EVOH is restored when the moisture is removed. Because the core EVOH layer is buried within the film, it is believed that it is less likely to take up water resulting from accidental rewetting. Accordingly, during accidental rewetting or high humidity situations, the core EVOH layer of the film maintains the barrier and is not as sensitive to environmental fluctuations compared to prior art films. Thus, the core EVOH barrier layer provides the film with superior barrier qualities during accidental rewetting situations.

Accordingly, the presently disclosed film comprises an EVOH barrier layer directly adjacent to an outer layer comprising a highly permeable material. In addition, the presently disclosed film comprises a core EVOH barrier layer. The combination of EVOH barrier layers in the disclosed film results in an improved film that can better withstand autoclave applications and accidental rewetting or high humidity situations, compared with prior art EVOH barrier films. Accordingly, the barrier film does not suffer from the undesirable characteristics (whitening or unsatisfactory appearance, including wavy wrinkles and patterns) when exposed to autoclave conditions, yet still maintains the high barrier property inherent to EVOH.

III.D. Layer Comprising Low Permeable Material

In the disclosed barrier film, a layer comprising one or more low permeable materials can be positioned between the two EVOH barrier layers. More specifically, the layer (in some embodiments, the third layer of a 5-layer film) can comprise a region comprising about 1 to 5 distinct sublayers comprising low permeable materials. Such low permeable materials desirably have moisture vapor permeability of less than about 20 g-mil/100 in$^2$-day-atm. Generally, the low permeable materials suitable for inclusion in the disclosed layer can be any polymeric material, so long as it has the requisite moisture vapor permeability.

In some embodiments, at least one of the layers of the first and second region in direct contact with an EVOH layer comprises a polymeric adhesive selected from the group consisting of: anhydride grafted ethylene/1-butene copolymer, anhydride grafted ethylene/1-hexene copolymer, polypropylene, propylene ethylene copolymer, ethylene vinyl acetate copolymer, ethylene methyl acrylate copolymer, and anhydride grafted ethylene/1-octene copolymer. In some embodiments, at least one layer of the first or second region comprises a polymer selected from the group consisting of: ethylene alpha olefin copolymer, high density polyethylene, polypropylene, polypropylene ethylene copolymer, and cyclo-olefin copolymer.

Continuing, the layer is defined by a region comprising 1 to 5 distinct sublayers. As used herein, the term "sublayer" refers to the thinnest unit of a film layer that contains all the elements of the film layer as a whole. Thus, each of the distinct 1 to 5 sublayers comprises at least one low permeable material having moisture vapor permeability of less than about 20 g-mil/100 in$^2$-day-atm.

The function of the layer or sublayers is to reduce the effect of moisture permeating the outside two layers of the film during incidental exposure to high relative humidities or direct moisture contact. The layer having moisture barrier properties shields the core EVOH layer from moisture, therefore maintaining the high gas barrier properties of the film.

III.E. Layer Comprising Very Low Permeable Material

In the disclosed barrier film, a layer comprising one or more very low permeable materials can be positioned adjacent to the core EVOH barrier layer. More specifically, the layer (in some embodiments, the fifth layer of a 5-layer film) can comprise a region comprising about 1 to 5 distinct sublayers comprising very low permeable materials. Such very low permeable materials desirably have a combined moisture vapor transmission rate of less than about 5 g/100 in$^2$-day-atm. Generally speaking, such very low permeable materials suitable for inclusion in the disclosed layer can be any polymeric material, so long as the totality of the sublayers has the requisite moisture vapor transmission rate. Specifically, such very low permeable materials can include, but are not limited to: ethylene alpha olefin copolymer, high density polyethylene, polypropylene, modified polypropylene, polypropylene ethylene copolymer, modified propylene ethylene copolymer, and cyclo-olefin copolymer.

The function of the layer or sublayers is to provide high relative humidity and moisture protection of the core EVOH layer from the contents of the package (product) that is typically a water-based solution. The high moisture barrier properties of this layer or sublayers prevent the permeation of moisture to the core EVOH layer, especially during exposure of the film to high moisture conditions during the autoclave cycle.

III.F. Additional Layers

In some embodiments, the film of the presently disclosed subject matter can comprise a sealant layer (i.e., a seal layer) adapted to facilitate the heat-sealing of the film to itself or to another object, such as a substrate. In general, sealant layers employed in the packaging art have included the genus of thermoplastic polymers.

In some embodiments, the disclosed film can comprise an abuse layer. The abuse layer can be any film layer, so long as the film layer serves to resist abrasion, puncture, or other potential causes of reduction of package integrity or package appearance quality. In some embodiments, abuse layers can comprise any polymer, so long as the polymer contributes to achieving an integrity goal and/or an appearance goal.

In some embodiments, the presently disclosed film can comprise a bulk layer that functions to increase the abuse resistance, toughness, and/or modulus of the film. Bulk layers generally comprise polymers that are inexpensive relative to other polymers in the film that provide some specific purpose unrelated to abuse-resistance, modulus, etc.

In some embodiments, the presently disclosed film can comprise one or more tie layers adapted for improving the adherence of one layer of said film to another layer. In some embodiments, tie layers can comprise any nonpolar polymer having a polar group grafted thereon, so that the polymer is capable of covalent bonding to polar polymers. In some embodiments, the adhesive layer can comprise an olefin polymer or copolymer having an anhydride functionality grafted thereon and/or copolymerized therewith and/or blended therewith. Preferred polymeric adhesives can include, but are not limited to, anhydride grafted ethylene/1-butene copolymer, anhydride grafted ethylene/1-hexene copolymer, and anhydride grafted ethylene/1-octene copolymer, anhydride grafted polypropylene, anhydride grafted high density polyethylene, anhydride grafted ethylene/methyl acrylate copolymer, and anhydride grafted ethylene/vinyl acetate copolymer.

IV. Methods of Making the Disclosed Film

Any suitable method of making a film having the particular layers disclosed herein above can be used to make a film in accordance with the presently disclosed subject matter. Suitable methods can include (but are not limited to) tubular cast coextrusion, such as that disclosed in U.S. Pat. No. 4,551,380 to Schoenberg, herein incorporated by reference in its entirety; flat cast extrusion; coextrusion; extrusion coating, lamination, and by other such techniques well known in the art.

For example, in some embodiments, the disclosed multilayer film can be formed by cast coextrusion as a tubular film. Containers for medical applications or other end uses can be made directly from the coextruded, tubular film. A hot blown process can also be used to make the film. When the total film thickness is 4 mils or less, a hot blown process is generally preferred. On the other hand, when the total film thickness is greater than 4 mils, a cast coextrusion process is generally preferred. Other processes, such as extrusion coating, conventional lamination, slot die extrusion, etc., can also be used to make the disclosed multilayer film, although these alternative processes can be more difficult or less efficient than the above methods.

Preparation of Compositions for Each Layer Used in the Disclosed Film can be achieved in several different ways. The components can be brought into intimate contact by, for example, dry blending the materials and then passing the overall composition through a compounding extruder. Alternatively, the components can be fed directly to a mixing device such as a compounding extruder, high shear continuous mixer, two roll mill or an internal mixer such as a Banbury mixer. It is also possible to achieve melt mixing in an extruder section of a coextrusion apparatus. Overall, the objective is to obtain a uniform dispersion of all ingredients, which can be achieved by inducing sufficient shear and heat to cause the plastics component(s) to melt. However, the time and temperature of mixing should be controlled as is normally done by one skilled in the art to avoid molecular weight degradation.

When film 10 is formed into a pouch, layer 12 will form the inside surface of the pouch, i.e., the surface that is in contact with the packaged product (for example, a medical solution). One function of layer 12 is to form a heat-seal when film 10 is folded upon itself or mated with another film such that two regions of layer 12 are brought into contact with one another and sufficient heat is applied to predetermined segments of the contacting regions of layer 12 that the heated segments become molten and intermix with one another. Upon cooling, the heated segments of layer 12 become a single, essentially inseparable layer. In this manner, the heated segments of layer 12 produce a liquid-tight closure that is commonly referred to as a heat seal. The heat seals thus formed are linked together to define the peripheral boundaries of the pouch so that a medical solution or other similar packaged product can be fully enclosed therein.

Thus, pouches made from the disclosed multilayer films, e.g., I.V. bags, drainage pouches, and the like, can be sealed by various means well known in the art, including (but not limited to) impulse, radio-frequency, and hot-bar sealing. An example of a commercially available impulse-type sealing device is a Vertrod™ heat sealer (available commercially from Vertrod, Inc.). The heat seals that form the top and bottom of the pouch can be formed in the machine direction of the multilayer film (i.e., the direction in which the film moved through the production equipment), verses the transverse direction (perpendicular to the machine direction).

The material from which the heat-seal layer is formed must be able to maintain a liquid-tight heat-seal in the severe conditions that are typically encountered by a medical solution pouch. During heat sterilization, for example, pouches are exposed to high temperatures (e.g., 250° F.) for periods of about 15 to 30 minutes. Thus, the heat-seal material must have sufficient heat resistance to maintain a seal under such conditions. In addition, the heat seal material must have sufficient creep resistance to maintain a heat seal when the pouch is placed in a pressure cuff. Without sufficient creep resistance, the relatively high fluid pressure of the medical solution inside the pouch can force the heat seal apart. Additionally, the heat seal material must have sufficient impact resistance to maintain a seal when the filled pouch is dropped or otherwise handled roughly.

According to another aspect of the presently disclosed subject matter, a method for producing the sublayers of the disclosed film is provided. The method includes coextruding 1 to 5 distinct sublayers comprising low permeable materials or very low permeable materials. The method can further include separating the layers, and thinning and widening the layers. Other methods known in the art to form the sublayers of the disclosed film can also be employed. Thus, the sublayers are formed in the same manner as the other layers. The term "sublayer" as used herein merely describes the way in which the layers are grouped together.

In some embodiments, the disclosed films can be cross-linked, depending upon the particular application in which such films are utilized. Cross-linking increases the structural strength of the film at elevated temperatures and/or increases the force at which the material can be stretched before tearing apart. Cross-linking can be performed by irradiation, i.e., bombarding the film with particulate or non-particulate radiation such as high-energy electrons from an accelerator or cobalt-60 gamma rays, to cross-link the materials of the film. In some embodiments, the irradiation dosage level is in the range of from about 2 megarads (M.R.) to about 12 M.R. Any conventional cross-linking technique can be used. For example, electronic cross-linking can be carried out by curtain-beam irradiation. Chemical cross-linking techniques can also be employed, e.g., by the use of peroxides.

In some embodiments, the presently disclosed subject matter relates to a method of making flexible film pouches having fitment tubes attached thereto. Such methods can comprise the steps of: introducing a web of flexible film into an open film-sealing device for forming the peripheral seams defining at least one pouch; introducing at least one fitment tube, mounted on fitment tube sealing device between the layers of the web of flexible film within the open film sealing means; closing the film sealing device; forming the peripheral pouch seals and sealing the fitment tubes in the thus formed pouch using heat sealing; introducing said pouch to a cutting means and contouring the pouch; and removing the pouch from the web of flexible film. Heat sealing equipment is well known in the art. Thus, equipment suitable for use with the presently disclosed subject matter is any of such equipment well known in the art used in well known ways.

Fitment tubes suitable for use in the disclosed pouches can be made of a single layer of polymeric material or can be made of multilayer polymeric material. The outside of the fitment tubes can have a composition that is heat sealable to the sealant layer of the flexible film or can be hermetically sealed to the sealant layer of the flexible film.

Suitable fitments include those commonly used and well understood in the art. These can include, for example, fitments as disclosed in U.S. Pat. No. 5,026,352 to Anderson and U.S. Pat. No. 4,324,423 to Pitesky. The fitment shape can have a circular cross section, but any desirable cross sectional shape that allows for hermetic sealing of the fitment to the fitment tubes is suitable. It is to be appreciated that the fitments can be attached to the fitment tubes either before or after the fitment tubes are sealed to the flexible film pouches.

In some embodiments, the disclosed multilayer film can be used to form a pouch containing a plurality of compartments. For example, medical solutions commonly are maintained in separate compartments until just prior to use. The compartments of such pouches are typically separated by frangible seals. The frangible seal remains intact when the pressure within the compartment is below a predetermined bursting pressure and ruptures when the pressure within the compartment is greater than such predetermined bursting pressure. Thus, just prior to administering to a patient, a user can exert pressure on the pouch to manually rupture the frangible seals. Once the frangible seal is ruptured, the solutions housed in the separate compartments can be intermixed.

Figure 3:
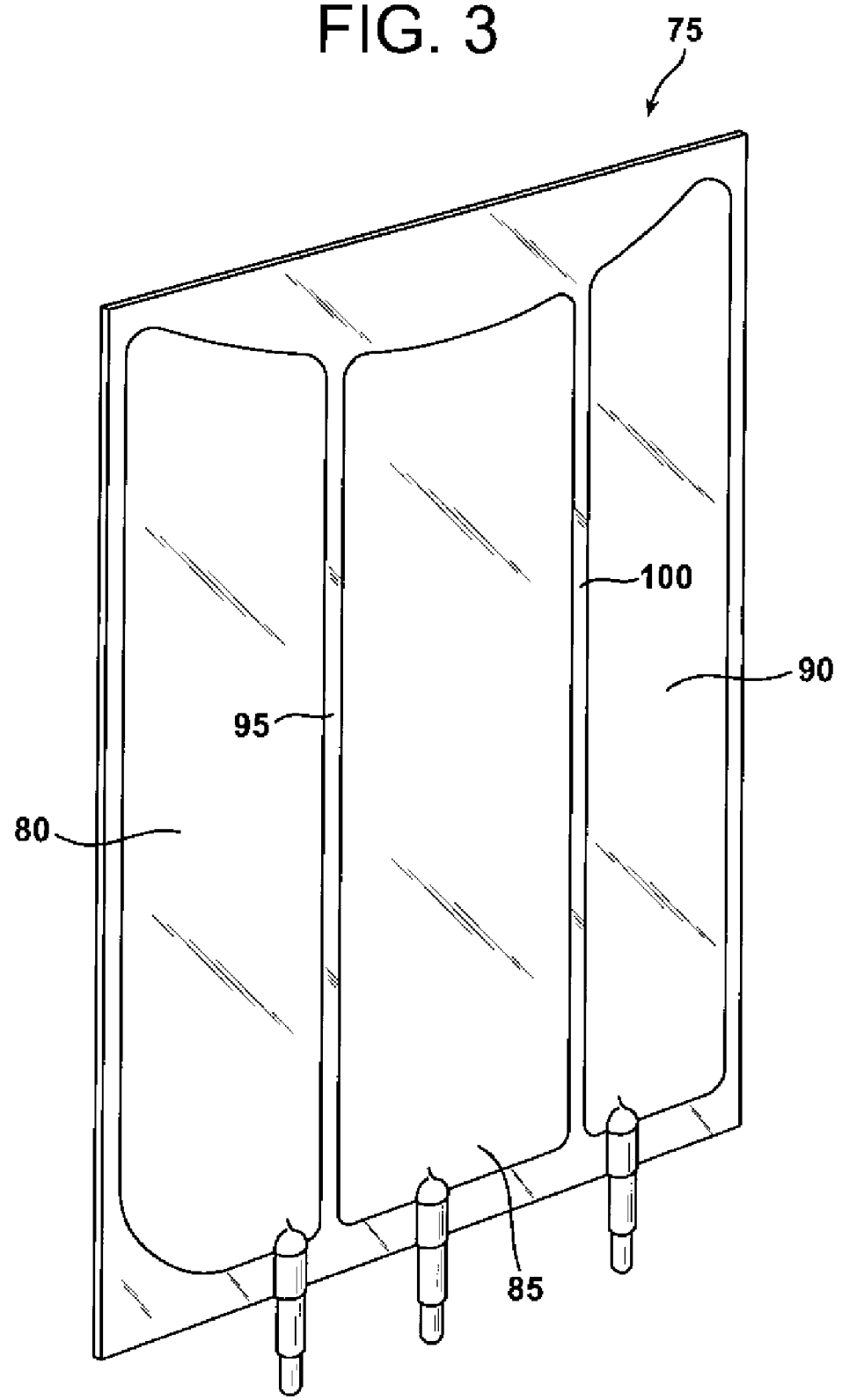
FIG. 3 illustrates a perspective view of an embodiment of a pouch of the presently disclosed subject matter.

FIG. 3 depicts an embodiment of a pouch formed from the film of the presently disclosed subject matter. Medical pouch 75 includes at least three compartments 80, 85, and 90. The compartments are designed for the separate storage of liquids and/or solutions. It should be noted that although three compartments 80, 85, and 90 are illustrated in FIG. 3, more or less compartments can be configured. Frangible seals 95 and 100 are provided between compartments 80 and 85, and 85 and 90, respectively. Frangible seals 95 and 100 allow for the selective opening of the chambers to allow for the mixing of the contents contained herein.

Frangible seals 95 and 100 can be formed using any of a number of well known methods. For example, the frangible seals can be formed using a seal bar heated to a cooler temperature than used to form typical pouch perimeter seals.

V. Characteristics of the Disclosed Film

Although a 5-layer film is depicted in FIG. 1, the presently disclosed subject matter can include films comprising at least 5 or more layers.

Particularly, in some embodiments, the disclosed film can have from 5 to 20 layers; in some embodiments, from 5 to 12 layers; and in some embodiments, from 5 to 10 layers. Thus, the disclosed film can have 5, 6, 7, 8, 9, 10, 11, 12, 13, 14, 15, 16, 17, 18, 19, or 20 layers. It is also noted that in some embodiments FIG. 1 is not drawn to scale and layers 12, 14, 16, 18, and 20 can be of varying thicknesses compared to one another.

Continuing, the disclosed multilayer film can have any total thickness, so long as the film provides the desired properties for the particular packaging operation in which the film is used. In some embodiments, the presently disclosed film can have a total thickness (i.e., a combined thickness of all layers), of from about 0.25 to 50 mils (1 mil equals 0.001 inch); in some embodiments, from about 0.5 to 20 mils; and in some embodiments, from about 2 to 14 mils.

In some embodiments, the disclosed film exhibits an oxygen transmission rate (OTR) after at least one hour after autoclave of about 0 to 10 $cc/m^2/atm/day$; in some embodiments, about 0 to 5 $cc/m^2/atm/day$; and in some embodiments, about 0 to 2 $cc/m^2/atm/day$. OTR refers to the rate of oxygen gas passing through an entire film structure and can be measured according to ASTM D-3985-81.

The flexible pouches can be of any desired size and shape. For example, for medical solutions for parenteral administration, the flexible pouches are generally rectangular in shape with rounded corners and having dimensions of about 180 mm wide by 350 mm long. It is to be appreciated that square corners and shapes other than rectangular can be produced and that such other shapes, corner geometries and sizes are contemplated by the presently disclosed subject matter. It is to be further appreciated that these parameters and how to achieve them are well understood in the art and can be determined without undo experimentation by one of ordinary skill in the art.

V. Methods of Using the Disclosed Film

In some embodiments, the presently disclosed subject matter is directed to methods of packaging an oxygen sensitive product in an barrier film. The method can comprise providing a film comprising a first layer comprising a highly permeable material having a moisture vapor permeability greater than about 40 g-mil/100 $in^2$-day-atm, a second layer directly adjacent to the first layer comprising EVOH, a first region defining a third layer comprising about 1 to 5 distinct sublayers comprising low permeable materials having moisture vapor permeability of less than about 20 g-mil/100 $in^2$-day-atm, a fourth layer comprising EVOH, and a second region defining a fifth layer comprising about 1 to 5 sublayers comprising very low permeable materials having a moisture vapor transmission rate of less than about 5 g/100 $in^2$-day-atm. The film is then formed into a pouch, and the pouch filled with the oxygen sensitive product. The pouch can then be sealed and subjected to autoclave conditions. In some embodiments, the package exhibits an OTR after at least one hour after autoclaving of about 0 to 10 $cc/m^2$-atm-day, in some embodiments about 0 to 5 $cc/m^2$-atm-day, in some embodiments about 0 to 2 $cc/m^2$-atm-day.

In some embodiments, the disclosed film can be used to form a package comprising an oxygen sensitive product and a sealed pouch containing the oxygen sensitive product. Thus, the disclosed film can be used to form a wide variety of packages. For example, disposable and flexible medical bags for filling with medical products. Such medical solutions can include, for example, parenteral, enteral, dialysis solutions, nutrients, and pharmacologic agents, including gene therapy and chemotherapy agents. The pouches meet the required performance criteria, including collapsibility, optical clarity and transparency, high-temperature heat resistance, and sufficient mechanical strength to withstand everyday handling.

In some embodiments, the medical pouches can hold a single medical solution. To deal with the disadvantages of separate containers, in some embodiments, the disclosed film can be used to construct flexible containers that include multiple chambers. To this end, such containers have an interior region that defines two or more chambers. One way to create such a container is via a frangible seal that divides the interior into at least two chambers. The frangible seal allows for the selective communication and mixing of the two components stored in the separate chambers.

In some embodiments, the disclosed film can have overwrap applications. For example, in some embodiments, the film can be used to produce a package comprising (a) a first pouch containing an oxygen sensitive product and (b) a second pouch containing the first pouch and the oxygen sensitive product. The second pouch containing the first pouch and product can be produced from the disclosed film. Such overwrap films are particularly suited for medical, laboratory, food, and other such applications where sterilization is important.

In some embodiments, the disclosed film can be used to reduce the loss of barrier in a package subjected to at least one hour of autoclaving or rewetting. The method comprises first packaging a product in a film. Such film can comprise a first layer comprising a highly permeable material having a moisture vapor permeability greater than about 40 g-mil/100 $in^2$-day-atm, a second layer directly adjacent to the first layer comprising EVOH, a first region defining a third layer comprising about 1 to 5 distinct sublayers comprising low permeable materials having moisture vapor permeability of less than about 20 g-mil/100 $in^2$-day-atm, a fourth layer comprising EVOH, and a second region defining a fifth layer comprising about 1 to 5 sublayers comprising very low permeable materials having a moisture vapor transmission rate of less than about 5 g/100 $in^2$-day-atm. The packaged product is then subjected to at least one hour of autoclaving or rewetting conditions. In some embodiments, the package exhibits an OTR after at least one hour after autoclaving of about 0 to 10 $cc/m^2$-atm-day, in some embodiments about 0 to 5 $cc/m^2$-atm-day, in some embodiments about 0 to 2 $cc/m^2$-atm-day. Thus, in some embodiments, the package can comprise a product and a pouch containing the product, where the pouch is constructed from the disclosed barrier film.

The disclosed multilayer films have been described in connection with medical applications. However, it is to be understood that other applications for the films are also possible (such as, for example, food applications). Accordingly, the subject disclosure should not be construed as being limited solely to medical pouches or devices.

Particularly, the disclosed film can be used to package a wide variety of products, including (but not limited to) medical products and devices, food products, and electronic products. Such products can include (but are not limited to) agricultural, industrial non-food, industrial overwrap, medical, retail consumer, food packaging, home, industrial, and construction, among other uses. Where the product being packaged is then desired to be sterilized, it can be subjected to suitable conditions by subjecting the entire package to an elevated temperature (such as, for example, in an autoclave) for a time sufficient to effectuate the degree of sterilization desired.

EXAMPLES

The following examples provide illustrative embodiments. In light of the present disclosure and the general level of skill in the art, those of ordinary skill can appreciate that the following examples are intended to be exemplary only and that numerous changes, modifications, and alterations can be employed without departing from the scope of the presently claimed subject matter.

Several film structures in accordance with the presently disclosed subject matter and comparatives are identified herein below.

TABLE 1

Resin Identification

| Material Code | Trade name Or Designation | Source(s) |
|---|---|---|
| A | GRILFLEX ™ FE 7150 | EMS-CHEMIE, Inc. (Sumter, South Carolina, United States of America) |
| B | GRILFLEX ™ FE 7149 | EMS-CHEMIE, Inc. (Sumter, South Carolina, United States of America) |
| C | XEP-1131B | EVALCA/Kuraray (New York, New York, United States of America) |
| D | ADMER ® AT1167A | Mitsui Chemical (New York, New York, United States of America) |
| E | EXACT ™ 3128 | ExxonMobile (Fairfax, Virginia, United States of America) |
| F | Petrothene ® NA 345-013 | Equistar Chemicals (Houston, Texas, United States of America) |
| G | 8650 | Total Petrochemicals (Bayport, Texas, United States of America) |
| H | CV77516X Voridian Developmental Plastomer | Eastman Chemical (Arlington, Virginia, United States of America) |
| I | Kraton ® G1652 | Kraton Polymers U.S., LLC (Houston, Texas, United States of America) |
| J | AFFINITY ™ EG 8100G | Dow (Midland, Michigan, United States of America) |

A is an elastomeric polyamide (nylon).
B is an elastomeric polyamide (nylon).
C is ethylene/vinyl alcohol copolymer with density of 1.19-1.122 g/cc.
D is a tie layer comprising very low density maleic anhydride-modified polyethylene, with density of 0.90-0.92 g/cc, melting temperature of 119-125° C., and vicat softening point of 95° C.
E is a very low density ethylene/butene copolymer with density of 0.900 g/cc and melting point of 92° C.
F is a low density polyethylene (LDPE) homopolymer with density of 0.918-0.924 g/cc at 23° C. and melting point (DSC) of 112° C.
G is a propylene/ethylene copolymer with DSC melting point of 131-137° C. and density of 0.89 g/cc.
H is a very low density polyethylene (VLDPE) having density of 0.916.
I is a styrene/ethylene/butylene terpolymer with a styrene:rubber ratio of 29:71 and specific gravity of 0.91.
J is a very low density ethylene/octene copolymer with density of 0.867-0.873 g/cc.

TABLE 2

Film Identification

| Film ID | Layer | Formulation | Volume % | Layer Thickness (mils) |
|---|---|---|---|---|
| Film 1 | 1 | 70% A 30% B | 7.8 | 0.61 |
|  | 2 | 100% C | 8.1 | 0.63 |
|  | 3 | 100% D | 8.2 | 0.64 |
|  | 4 | 100% E | 6.4 | 0.5 |
|  | 5 | 100% D | 3.9 | 0.31 |
|  | 6 | 60% E 40% F | 44.2 | 3.44 |
|  | 7 | 50% E 50% G | 4.8 | 0.37 |
|  | 8 | 10% H 80% G 10% I | 1.6 | 1.28 |
| Film 2 | 1 | 70% A 30% B | 9.3 | 0.70 |
|  | 2 | 100% D | 3.6 | 0.27 |
|  | 3 | 60% E 40% F | 29.7 | 2.24 |
|  | 4 | 100% D | 2.8 | 0.21 |
|  | 5 | 100% C | 9.54 | 0.72 |
|  | 6 | 100% D | 2.6 | 0.20 |
|  | 7 | 60% E 40% F | 28.5 | 2.15 |
|  | 8 | 100% J | 3.9 | 0.30 |
|  | 9 | 10% H 80% G 10% I | 10.0 | 0.76 |
| Film 3 | 1 | 70% A 30% B | 7.0 | 0.59 |
|  | 2 | 100% C | 5.6 | 0.47 |
|  | 3 | 100% D | 7.7 | 0.65 |
|  | 4 | 100% C | 8.8 | 0.74 |
|  | 5 | 100% D | 5.0 | 0.42 |
|  | 6 | 60% E 40% F | 46.0 | 3.86 |
|  | 7 | 50% E 50% G | 3.4 | 0.29 |
|  | 8 | 10% H 80% G 10% I | 16.6 | 1.40 |
| Film 4 | 1 | 70% A 30% B | 9.2 | 0.39 |
|  | 2 | 100% D | 6.1 | 0.26 |
|  | 3 | 60% E 40% F | 13.2 | 0.56 |
|  | 4 | 100% D | 5.7 | 0.24 |
|  | 5 | 100% C | 24.3 | 1.03 |
|  | 6 | 100% D | 4.7 | 0.2 |
|  | 7 | 60% E 40% F | 11.1 | 0.47 |
|  | 8 | 100% J | 6.1 | 0.26 |
|  | 9 | 10% H 80% G 10% I | 19.4 | 0.82 |
| Film 5 | 1 | 70% A 30% B | 5.0 | 0.42 |
|  | 2 | 100% C | 10.6 | 0.89 |
|  | 3 | 100% D | 5.7 | 0.48 |
|  | 4 | 100% C | 4.7 | 0.39 |
|  | 5 | 100% D | 3.8 | 0.32 |
|  | 6 | 60% E 40% F | 52.8 | 4.41 |
|  | 7 | 50% E 50% G | 3.3 | 0.28 |
|  | 8 | 10% H 80% G 10% I | 13.9 | 1.16 |
| Film 6 | 1 | 70% A 30% B | 7.8 | 0.598 |
|  | 2 | 100% C | 7.0 | 0.535 |
|  | 3 | 100% D | 4.8 | 0.365 |
|  | 4 | 60% E 40% F | 17.9 | 1.368 |
|  | 5 | 100% D | 1.3 | 0.103 |
|  | 6 | 60% E 40% F | 39.9 | 2.967 |
|  | 7 | 50% E 50% G | 4.1 | 0.313 |
|  | 8 | 10% H 80% G 10% I | 18.0 | 1.377 |
| Film 7 | 1 | 70% A 30% B | 7.6 | 0.55 |
|  | 2 | 100% D | 3.9 | 0.28 |
|  | 3 | 60% E 40% F | 0.282 | 2.030 |
|  | 4 | 100% D | 3.2 | 0.23 |
|  | 5 | 100% C | 13.5 | 0.97 |
|  | 6 | 100% D | 2.8 | 0.20 |
|  | 7 | 60% E 40% F | 26.9 | 1.94 |
|  | 8 | 100% J | 4.0 | 0.29 |
|  | 9 | 10% H 80% G 10% I | 10.0 | 0.72 |

TABLE 2-continued

Film Identification

| Film ID | Layer | Formulation | Volume % | Layer Thickness (mils) |
|---|---|---|---|---|
| Film 8 | 1 | 70% A 30% B | 5.9 | 0.47 |
| | 2 | 100% C | 4.8 | 0.38 |
| | 3 | 100% D | 8.9 | 0.71 |
| | 4 | 100% C | 9.9 | 0.79 |
| | 5 | 100% D | 3.6 | 0.29 |
| | 6 | 60% E 40% F | 46.4 | 3.69 |
| | 7 | 50% E 50% G | 4.0 | 0.32 |
| | 8 | 10% H 80% G 10% I | 16.5 | 1.31 |
| Film 9 | 1 | 70% A 30% B | 10.9 | 0.79 |
| | 2 | 100% D | 3.7 | 0.27 |
| | 3 | 60% E 40% F | 31.4 | 2.27 |
| | 4 | 100% D | 3.1 | 0.22 |
| | 5 | 100% C | 6.6 | 0.48 |
| | 6 | 100% D | 2.8 | 0.20 |
| | 7 | 60% E 40% F | 27.1 | 1.96 |
| | 8 | 100% J | 3.7 | 0.27 |
| | 9 | 10% H 80% G 10% I | 10.5 | 0.76 |

Preparation of the Disclosed Films

The films of the examples were prepared utilizing a tubular cast coextrusion process. The process consists of seven extruders, six 1¾" extruders and one 1¼" extruder. Each material of each extruder feeds a tubular coextrusion die at the rates appropriate to supply the desired layer thickness. The coextrusion die is configured in a manner to provide the appropriate material to the desired layer location of the films in the examples. The extrudate is water quenched utilizing a water ring that supplies chilled water to the extrudate in a controlled and even manner. The cooled extruded tube is collapsed and conveyed utilizing a series of rollers to a slitting station that slits the edges of the tube into two plies. The two plies are wound onto a core. When the desired film quantity has been produced, the film is cut and the roll of doublewound film is transferred to an e-beam unit where the film is unwound irradiated to the appropriate dosage and rewound. Following the irradiation step the film is ready to convert into bags.

Example 1

Mocon Testing of Autoclaved Films 2, 4, 7, 8, and 9 at 0% Relative Humidity

Duplicates of Films 2, 4, 8 and triplicates of Films 7 and 9 were Mocon tested to determine the OTR rate of the films immediately after autoclaving at 0% relative humidity.

9"×16" pouches were prepared and filled with about 2 liters of water. The filled pouches were autoclaved in a Surdry Model A-142 autoclave (available from Surdry, Vizcaya, Spain) at 121° C. for 25 minutes. For oxygen permeability testing, a Mocon Model 702 (available from Mocon, Inc., Minneapolis, Minn., United States of America) was used to receive samples immediately after autoclaving. The pouches were directly cut open and the water drained from the pouches. Film discs were cut from the pouches and loaded into the Mocon cells without preconditioning. The cells then began measuring OTR without a baseline.

OTR was measured at various timepoints taken from 0 to 140 hours after the film was removed from the autoclave. It took about an hour from the time that the pouches were removed from the autoclave until the film discs were loaded onto the Mocon for testing. Thus, timepoint 0 is actually measured 1 hour from removing the pouches from the autoclave. (A), (B), and (C) represent different replicates of the same film.

Film 8 (with a core EVOH barrier layer and an EVOH barrier layer directly adjacent to an outer polyamide layer) had substantially lower OTR over the time course, compared to Films 2, 4, 7, and 9 (which all have a core EVOH barrier layer only). Thus, films comprising both a core EVOH barrier layer and an EVOH barrier layer directly adjacent to an outer polyamide layer exhibit significantly improved recovery from autoclave shock compared to films comprising only an inner EVOH barrier layer. Particularly, Film 8 recovered barrier properties more quickly after autoclaving, compared to Films 2, 4, 7, and 9. Films 2, 4, 7, and 9 recovered barrier properties about 115, 70, 130, and 105 hours respectively after autoclaving.

From the data, films 2, 7, and 9 (which comprise a core EVOH barrier layer) have high OTR immediately after autoclaving. Thus, films 2, 7, and 9 experience significant and extended loss of EVOH barrier properties immediately after autoclaving.

Film 4, typically used for overwrap applications, is a thinner film compared to Films 2, 9, and 7, and recovers significantly faster than films 2, 9, and 7 because less moisture is trapped during autoclaving and the moisture that is trapped in the film after autoclaving exits the film more rapidly due to the lower mass of the film. With regard to Film 8, it is apparent that the film does not experience significant loss of EVOH barrier properties immediately after autoclaving.

The OTR data for the Mocon testing results of Films 2, 4, 7, 8, and 9 is given below in Tables 3, 4, 5, 6, and 7, respectively.

TABLE 3

OTR Data of Film 2 at 0-140 Hours After Autoclaving (0% RH)

| Film # | Time hrs) | OTR value (cc/m²/d) | Film # | Time (hrs) | OTR value (cc/m²/d) |
|---|---|---|---|---|---|
| 2 | 55 | 93.64 | 2 | 45 | 231.8 |
| | 60 | 50.87 | | 50 | 164.9 |
| | 66 | 26.06 | | 55 | 108.17 |
| | 72 | 12.96 | | 61 | 64.67 |
| | 77 | 6.98 | | 66 | 35.40 |
| | 82 | 4.217 | | 71 | 18.64 |
| | 89 | 2.97 | | 77 | 9.66 |
| | 93 | 2.30 | | 84 | 5.44 |
| | 98 | 1.93 | | 89 | 3.46 |
| | 103 | 1.68 | | 94 | 2.54 |
| | 109 | 1.51 | | 99 | 1.99 |
| | 114 | 1.36 | | 105 | 1.69 |
| | 119 | 1.23 | | 111 | 1.48 |
| | 124 | 1.15 | | 115 | 1.33 |
| | 130 | 1.08 | | 120 | 1.21 |
| | 135 | 1.02 | | 126 | 1.12 |
| | 140 | 0.99 | | 131 | 1.07 |
| | | | | 136 | 0.99 |

TABLE 4

OTR Data of Film 4 at 0-140 Hours After Autoclaving (0% RH)

| Film # | Time (hrs) | OTR value (cc/m²/d) | Film # | Time (hrs) | OTR value (cc/m²/d) |
|---|---|---|---|---|---|
| 4 | 26 | 220.00 | 4 | 28 | 104.77 |
|  | 31 | 102.22 |  | 32 | 52.40 |
|  | 35 | 46.32 |  | 36 | 23.27 |
|  | 38 | 18.75 |  | 39 | 10.21 |
|  | 42 | 7.75 |  | 43 | 4.91 |
|  | 46 | 9.997 |  | 48 | 2.80 |
|  | 51 | 2.43 |  | 53 | 1.91 |
|  | 56 | 1.713 |  | 58 | 1.43 |
|  | 61 | 1.29 |  | 64 | 1.12 |
|  | 66 | 1.05 |  | 69 | 0.93 |
|  | 72 | 0.89 |  | 74 | 0.81 |
|  | 77 | 0.78 |  | 79 | 0.72 |
|  | 82 | 0.70 |  | 85 | 0.65 |
|  | 103 | 0.54 |  | 90 | 0.62 |
|  | 129 | 0.44 |  | 126 | 0.46 |

TABLE 5

OTR Data of Film 7 at 0-140 Hours After Autoclaving (0% RH)

| Film # | Time (hrs) | OTR value (cc/m²/d) | Film # | Time (hrs) | OTR value (cc/m²/d) | Film # | Time (hrs) | OTR value (cc/m²/d) |
|---|---|---|---|---|---|---|---|---|
| 7 | 31 | 207.65 | 7 | 47 | 254.3 | 7 | 46 | 206.5 |
|  | 38 | 127.26 |  | 52 | 205.9 |  | 53 | 159.4 |
|  | 39 | 112.2 |  | 57 | 159.3 |  | 59 | 115.93 |
|  | 41 | 98.73 |  | 63 | 119.35 |  | 64 | 80.97 |
|  | 42 | 86.9 |  | 68 | 85.53 |  | 69 | 54.47 |
|  | 44 | 74.16 |  | 73 | 58.19 |  | 75 | 34.94 |
|  | 45 | 65.13 |  | 78 | 38.11 |  | 80 | 21.89 |
|  | 50 | 37.54 |  | 84 | 24.23 |  | 85 | 13.08 |
|  | 56 | 20.187 |  | 89 | 14.57 |  | 90 | 8.16 |
|  | 61 | 10.06 |  | 94 | 9.126 |  | 96 | 5.46 |
|  | 66 | 52.11 |  | 99 | 5.92 |  | 101 | 3.89 |
|  | 71 | 2.93 |  | 105 | 4.09 |  | 106 | 2.98 |
|  | 77 | 1.91 |  | 111 | 3.07 |  | 111 | 2.40 |
|  | 82 | 1.45 |  | 116 | 2.41 |  | 117 | 2.03 |
|  | 87 | 1.238 |  | 121 | 2.02 |  | 122 | 1.78 |
|  | 93 | 1.12 |  | 127 | 1.74 |  | 127 | 1.57 |
|  | 98 | 1.03 |  | 133 | 1.56 |  | 132 | 1.42 |
|  | 103 | 0.955 |  | 139 | 1.41 |  |  |  |
|  | 108 | 0.875 |  |  |  |  |  |  |

TABLE 6

OTR Data of Film 8 at 0-140 Hours After Autoclaving (0% RH)

| Film # | Time hrs) | OTR value (cc/m²/d) | Film # | Time (hrs) | OTR value (cc/m²/d) |
|---|---|---|---|---|---|
| 8 | 2 | 1.61 | 8 | 5 | 0.94 |
|  | 4 | 1.17 |  | 10 | 0.77 |
|  | 8 | 1.035 |  | 13 | 0.74 |
|  | 12 | 0.929 |  | 15 | 0.72 |
|  | 14 | 0.906 |  | 18 | 0.72 |
|  | 17 | 0.88 |  | 26 | 0.897 |
|  | 19 | 0.86 |  | 30 | 0.80 |
|  | 64 | 0.75 |  | 35 | 0.754 |
|  | 75 | 0.53 |  | 38 | 0.730 |
|  | 80 | 0.43 |  | 87 | 0.418 |
|  | 85 | 0.36 |  | 100 | 0.32 |
|  | 100 | 0.404 |  |  |  |

TABLE 7

OTR Data of Film 9 at 0-140 Hours After Autoclaving (0% RH)

| Film # | Time (hrs) | OTR value (cc/m²/d) | Film # | Time (hrs) | OTR value (cc/m²/d) | Film # | Time (hrs) | OTR value (cc/m²/d) |
|---|---|---|---|---|---|---|---|---|
| 9 | 46 | 100.66 | 9 | 46 | 139.9 | 9 | 49 | 123.4 |
|  | 51 | 53.7 |  | 52 | 72.58 |  | 54 | 61.26 |
|  | 57 | 25.7 |  | 57 | 32.54 |  | 58 | 26.09 |
|  | 62 | 11.11 |  | 61 | 13.70 |  | 65 | 10.35 |
|  | 67 | 5.38 |  | 67 | 6.48 |  | 70 | 46.97 |
|  | 72 | 3.17 |  | 73 | 3.80 |  | 75 | 2.95 |
|  | 77 | 2.24 |  | 78 | 2.64 |  | 81 | 2.15 |
|  | 83 | 1.77 |  | 83 | 2.09 |  | 86 | 1.66 |
|  | 88 | 1.50 |  | 88 | 1.76 |  | 91 | 1.44 |
|  | 93 | 1.33 |  | 94 | 1.53 |  | 96 | 1.25 |
|  | 98 | 1.19 |  | 99 | 1.36 |  | 102 | 1.12 |
|  | 104 | 1.10 |  | 104 | 1.23 |  | 107 | 0.99 |
|  | 109 | 1.02 |  | 110 | 1.11 |  | 112 | 0.91 |
|  | 114 | 0.96 |  | 115 | 1.04 |  | 117 | 0.86 |
|  | 120 | 0.92 |  | 120 | 0.96 |  | 123 | 0.80 |
|  | 125 | 0.89 |  | 125 | 0.91 |  | 129 | 0.75 |
|  | 130 | 0.86 |  | 130 | 0.87 |  | 134 | 0.71 |

Example 2

OTR of Films 3, 5, 6 Immediately After Autoclaving at 50/100% RH

Duplicates of Films 3, 5, and 6 were Mocon tested as in Example 1 to determine the OTR of the films immediately after autoclaving at 50/100% RH, i.e., the inside of the film was exposed to 100% RH to stimulate a package containing an aqueous solution, and the outside of the package was exposed to 50% RH. The conditions closely simulate actual end use conditions for medical solution products. Under these conditions, oxygen permeability was measured using the same procedures as in Example 1, with the exception of the relative humidity.

OTR was measured at various timepoints taken from 0 to 95 hours after the film was removed from the autoclave. From the data, each of films 3 and 5, (which have a core EVOH barrier layer and an EVOH barrier layer directly adjacent to an outer polyamide layer) experienced substantially lower OTR over the time course. Thus, films comprising both a core EVOH barrier layer and an EVOH barrier layer directly adjacent to an outer polyamide layer exhibit significantly improved recovery from autoclave shock immediately after autoclaving at 50/100% relative humidity. Film 6 (which has an EVOH barrier layer directly adjacent to an outer polyamide, but does not possess a core barrier EVOH layer) performs similarly to Films 3 and 5, indicating that the recovery of barrier properties after autoclaving is the function of the outer EVOH barrier layer adjacent to the highly moisture permeable polyamide.

The results of the Mocon testing are given in Tables 8, 9, and 10.

TABLE 8

OTR Data of Film 3 at 0-140 Hours After Autoclaving (50/100% RH)

| Film | Time (hrs) | OTR (cc/m²/d) | Film | Time (hrs) | OTR (cc/m²/d) |
|---|---|---|---|---|---|
| 3 | 4 | 2.22 | 3 | 5 | 1.57 |
|  | 11 | 1.43 |  | 12 | 1.50 |
|  | 20 | 1.44 |  | 21 | 1.50 |
|  | 28 | 1.38 |  | 29 | 1.40 |

TABLE 8-continued

OTR Data of Film 3 at 0-140 Hours After Autoclaving (50/100% RH)

| Film | Time (hrs) | OTR (cc/m²/d) | Film | Time (hrs) | OTR (cc/m²/d) |
|---|---|---|---|---|---|
|  | 36 | 1.20 |  | 37 | 1.11 |
|  | 44 | 0.86 |  | 45 | 0.88 |
|  | 52 | 0.77 |  | 53 | 0.85 |
|  | 60 | 0.82 |  | 61 | 0.88 |
|  | 67 | 0.90 |  | 68 | 0.93 |
|  | 75 | 0.92 |  | 76 | 0.88 |
|  | 83 | 1.01 |  | 84 | 0.93 |
|  | 91 | 1.06 |  | 92 | 0.95 |

TABLE 9

OTR Data of Film 5 at 0-140 Hours After Autoclaving (50/100% RH)

| Film | Time (hrs) | OTR (cc/m²/d) | Film | Time (hrs) | OTR (cc/m²/d) |
|---|---|---|---|---|---|
| 5 | 2 | 13.16 | 5 | 3 | 3.17 |
|  | 10 | 1.69 |  | 11 | 1.65 |
|  | 18 | 1.70 |  | 19 | 1.68 |
|  | 26 | 1.49 |  | 27 | 1.63 |
|  | 34 | 1.20 |  | 35 | 1.35 |
|  | 42 | 0.98 |  | 43 | 0.92 |
|  | 49 | 1.00 |  | 50 | 0.80 |
|  | 57 | 0.93 |  | 58 | 0.79 |
|  | 65 | 0.83 |  | 66 | 0.72 |
|  | 73 | 0.68 |  | 74 | 0.58 |
|  | 81 | 0.74 |  | 82 | 0.58 |
|  | 89 | 0.73 |  | 90 | 0.58 |

TABLE 10

OTR Data of Film 6 at 0-140 Hours After Autoclaving (50/100% RH)

| Film | Time (hrs) | OTR (cc/m²/d) | Film | Time (hrs) | OTR (cc/m²/d) |
|---|---|---|---|---|---|
| 6 | 7 | 1.26 | 6 | 8 | 1.36 |
|  | 15 | 1.15 |  | 16 | 1.03 |
|  | 22 | 1.06 |  | 23 | 0.99 |
|  | 30 | 0.98 |  | 31 | 0.94 |
|  | 38 | 0.89 |  | 39 | 0.86 |
|  | 46 | 0.80 |  | 47 | 0.81 |
|  | 54 | 0.68 |  | 55 | 0.73 |
|  | 62 | 0.64 |  | 63 | 0.62 |
|  | 70 | 0.62 |  | 71 | 0.57 |
|  | 78 | 0.60 |  | 79 | 0.54 |
|  | 85 | 0.59 |  | 86 | 0.54 |
|  | 93 | 0.61 |  | 94 | 0.55 |

Example 3

OTR of Rewetted Autoclaved Films 1, 2, and 3 at 100/75 RH

Films 1, 2, and 3 were filled, autoclaved at 121° C. for 25 minutes, and drained as in Example 1. Based on earlier Macon tests, it was expected that the moisture shock of the pouches would not last more than 1 week. In order to allow the barrier properties of the films to return to dry values, about 1 month passed before further testing was done to ensure that the films were dry.

After the barrier properties returned to dry values, the films were rewetted by the Macon test cell during testing when exposed to the 75/100% RH conditions simulating a sudden increase in humidity as could be encountered in storage in uncontrolled warehousing. The OTR values for Films 1, 2, and 3 were then determined using Mocon testing, as in Example 1.

From the data, Film 2 (which has a core EVOH barrier layer) exhibited the highest OTR after rewetting. In comparison, Film 3 (which has an EVOH barrier core layer and an EVOH barrier layer directly adjacent to an outer polyamide layer) had the lowest OTR. Film 1 (which had an EVOH barrier layer directly adjacent to an outer polyamide layer) had OTR higher than Film 3, but lower than Film 1. Accordingly, the two EVOH layers in Film 3 shielded the film from loss of barrier properties resulting from the post-autoclave rewetting of the films.

OTR data is given in Table 11 below.

TABLE 11

OTR of Rewetted Films 1, 2, 3 at 0-140 Hours After Autoclaving (100/75% RH)

| Film | Time (hrs) | OTR (cc/m²/d) |
|---|---|---|
| 1 | 4 | 7.80 |
|  | 6 | 3.95 |
|  | 12 | 5.80 |
|  | 13 | 3.50 |
|  | 20 | 3.60 |
|  | 21 | 1.60 |
|  | 28 | 4.36 |
|  | 29 | 2.95 |
|  | 36 | 4.72 |
|  | 37 | 3.50 |
|  | 44 | 5.07 |
|  | 45 | 3.95 |
|  | 52 | 5.60 |
|  | 53 | 4.60 |
|  | 60 | 5.90 |
|  | 61 | 5.00 |
|  | 67 | 6.20 |
|  | 69 | 5.40 |
|  | 75 | 6.50 |
|  | 76 | 5.60 |
|  | 83 | 6.85 |
|  | 84 | 6.00 |
|  | 91 | 7.15 |
|  | 92 | 6.14 |
|  | 99 | 7.38 |
|  | 100 | 6.40 |
|  | 107 | 7.59 |
|  | 108 | 6.50 |
|  | 115 | 7.80 |
|  | 116 | 6.80 |
|  | 123 | 7.60 |
|  | 124 | 6.96 |
|  | 130 | 8.13 |
|  | 132 | 7.00 |
|  | 138 | 8.26 |
|  | 139 | 7.15 |
|  | 146 | 8.51 |
|  | 147 | 7.14 |
|  | 154 | 8.65 |
|  | 155 | 7.30 |
|  | 162 | 8.80 |
|  | 163 | 7.20 |
|  | 170 | 8.74 |
|  | 171 | 7.40 |
|  | 178 | 9.04 |
|  | 179 | 7.65 |
|  | 185 | 9.11 |
|  | 187 | 7.60 |
|  | 193 | 9.10 |
|  | 195 | 7.54 |
|  | 202 | 9.13 |
|  | 203 | 7.40 |
|  | 209 | 9.30 |
|  | 210 | 7.50 |
|  | 217 | 9.30 |

TABLE 11-continued

OTR of Rewetted Films 1, 2, 3 at 0-140 Hours After Autoclaving (100/75% RH)

| Film | Time (hrs) | OTR (cc/m$^2$/d) |
|---|---|---|
|  | 218 | 7.56 |
|  | 225 | 9.40 |
|  | 226 | 7.46 |
|  | 233 | 9.50 |
|  | 234 | 7.40 |
|  | 241 | 9.90 |
|  | 242 | 7.35 |
|  | 249 | 10.14 |
|  | 250 | 7.37 |
|  | 256 | 10.30 |
|  | 258 | 7.27 |
|  | 264 | 10.30 |
|  | 265 | 7.25 |
|  | 272 | 10.50 |
|  | 273 | 7.34 |
|  | 280 | 10.80 |
|  | 281 | 7.43 |
|  | 288 | 10.80 |
|  | 289 | 7.50 |
|  | 296 | 10.90 |
|  | 297 | 7.46 |
| 2 | 7 | 3.71 |
|  | 8 | 4.85 |
|  | 15 | 1.37 |
|  | 16 | 1.28 |
|  | 22 | 1.06 |
|  | 24 | 1.20 |
|  | 30 | 0.86 |
|  | 31 | 1.04 |
|  | 38 | 1.46 |
|  | 39 | 2.35 |
|  | 46 | 2.50 |
|  | 47 | 3.60 |
|  | 54 | 3.37 |
|  | 55 | 4.70 |
|  | 62 | 4.28 |
|  | 63 | 5.68 |
|  | 70 | 5.06 |
|  | 71 | 6.70 |
|  | 78 | 5.90 |
|  | 79 | 7.50 |
|  | 85 | 6.50 |
|  | 87 | 8.46 |
|  | 93 | 7.24 |
|  | 94 | 9.00 |
|  | 101 | 7.95 |
|  | 102 | 9.73 |
|  | 109 | 8.42 |
|  | 110 | 10.56 |
|  | 117 | 8.91 |
|  | 118 | 11.11 |
|  | 125 | 9.41 |
|  | 126 | 12.2 |
|  | 133 | 9.83 |
|  | 134 | 12.0 |
|  | 141 | 10.17 |
|  | 142 | 12.30 |
|  | 148 | 10.52 |
|  | 149 | 12.50 |
|  | 156 | 10.85 |
|  | 157 | 13.90 |
|  | 164 | 11.20 |
|  | 165 | 13.84 |
|  | 172 | 11.30 |
|  | 173 | 13.90 |
|  | 180 | 11.50 |
|  | 181 | 14.20 |
|  | 188 | 11.60 |
|  | 189 | 14.15 |
|  | 196 | 11.70 |
|  | 197 | 14.23 |
|  | 204 | 11.70 |
|  | 205 | 14.47 |
|  | 211 | 11.94 |
|  | 213 | 13.70 |
|  | 219 | 11.94 |
|  | 220 | 15.90 |
|  | 227 | 12.02 |
|  | 228 | 14.90 |
|  | 235 | 12.04 |
|  | 236 | 14.70 |
|  | 243 | 12.06 |
|  | 244 | 14.2 |
|  | 251 | 12.07 |
|  | 252 | 14.80 |
|  | 259 | 12.04 |
|  | 260 | 1560 |
|  | 267 | 11.97 |
|  | 268 | 14.80 |
|  | 274 | 12.00 |
|  | 276 | 14.90 |
|  | 282 | 12.00 |
|  | 283 | 14.90 |
|  | 290 | 12.00 |
|  | 291 | 14.80 |
|  | 298 | 11.90 |
|  | 299 | 14.70 |
| 3 | 2 | 3.60 |
|  | 3 | 1.56 |
|  | 10 | 1.20 |
|  | 11 | 1.20 |
|  | 18 | 1.50 |
|  | 19 | 1.50 |
|  | 26 | 1.50 |
|  | 27 | 1.50 |
|  | 34 | 1.07 |
|  | 35 | 0.98 |
|  | 42 | 0.70 |
|  | 43 | 0.63 |
|  | 49 | 1.08 |
|  | 51 | 1.25 |
|  | 57 | 1.50 |
|  | 58 | 1.60 |
|  | 65 | 1.80 |
|  | 66 | 1.90 |
|  | 73 | 2.00 |
|  | 74 | 2.00 |
|  | 81 | 2.23 |
|  | 82 | 2.30 |
|  | 89 | 2.44 |
|  | 90 | 2.46 |
|  | 97 | 2.46 |
|  | 98 | 2.53 |
|  | 105 | 2.58 |
|  | 106 | 2.54 |
|  | 112 | 2.60 |
|  | 114 | 2.60 |
|  | 120 | 2.70 |
|  | 121 | 2.70 |
|  | 128 | 2.70 |
|  | 129 | 2.50 |
|  | 136 | 2.70 |
|  | 137 | 2.60 |
|  | 144 | 2.80 |
|  | 145 | 2.60 |
|  | 152 | 2.70 |
|  | 153 | 2.60 |
|  | 160 | 2.70 |
|  | 161 | 2.60 |
|  | 168 | 2.70 |
|  | 169 | 2.50 |
|  | 176 | 2.70 |
|  | 177 | 2.60 |
|  | 183 | 2.70 |
|  | 184 | 2.50 |
|  | 191 | 2.70 |
|  | 192 | 2.50 |
|  | 199 | 2.60 |

TABLE 11-continued

OTR of Rewetted Films 1, 2, 3 at 0-140 Hours After Autoclaving (100/75% RH)

| Film | Time (hrs) | OTR (cc/m$^2$/d) |
|---|---|---|
| | 200 | 2.40 |
| | 207 | 2.70 |
| | 208 | 2.40 |
| | 215 | 2.60 |
| | 216 | 2.40 |
| | 223 | 2.60 |
| | 224 | 2.30 |
| | 231 | 2.50 |
| | 232 | 2.20 |
| | 239 | 2.60 |
| | 240 | 2.30 |
| | 247 | 2.60 |
| | 248 | 2.20 |
| | 254 | 2.50 |
| | 255 | 2.20 |
| | 262 | 2.40 |
| | 263 | 2.10 |
| | 270 | 2.50 |
| | 271 | 2.10 |
| | 278 | 2.50 |
| | 279 | 2.10 |
| | 286 | 2.40 |
| | 287 | 2.03 |
| | 294 | 2.40 |
| | 295 | 1.92 |
| | 300 | 2.40 |

Example 4

OTR of Rewetted Autoclaved Films 1, 2, and 3 at 100/85% RH Films 1, 2, and 3 were autoclaved as in Example 3. After the barrier properties had returned to dry values, the films were rewetted and the OTR values for Films 1, 2, and 3 were then determined at 100/85% RH using Mocon testing, as in Example 1.

From the data, Film 1 (which had an EVOH barrier layer directly adjacent to an outer polyamide layer) exhibited the highest OTR after rewetting. In comparison, Film 3 (which has an EVOH barrier core layer and an EVOH barrier layer directly adjacent to an outer polyamide layer) had the lowest OTR. Film 2 (which has a core EVOH barrier layer) had OTR higher than Film 3, but lower than Film 1. Accordingly, the two EVOH layers in Film 3 shielded the film from loss of barrier properties resulting from the post-autoclave rewetting of the films.

OTR Data is given in Table 12 below.

TABLE 12

OTR of Rewetted Films 1, 2, 3 at 0-140 Hours After Autoclaving (100/85% RH)

| Film | Time (hrs) | OTR (cc/m$^2$/d) |
|---|---|---|
| 1 | 7 | 18.74 |
| | 8 | 16.65 |
| | 13 | 22.18 |
| | 15 | 16.45 |
| | 16 | 15.80 |
| | 21 | 20.09 |
| | 22 | 18.91 |
| | 24 | 17.61 |
| | 29 | 24.52 |
| | 30 | 23.82 |
| | 31 | 21.69 |
| | 37 | 26.41 |
| | 38 | 25.94 |
| | 39 | 23.80 |
| | 45 | 27.72 |
| | 46 | 27.72 |
| | 47 | 25.17 |
| | 53 | 29.18 |
| | 54 | 29.07 |
| | 55 | 26.34 |
| | 61 | 30.28 |
| | 62 | 30.21 |
| | 63 | 28.42 |
| | 69 | 31.22 |
| | 70 | 31.24 |
| | 71 | 28.60 |
| | 76 | 31.63 |
| | 78 | 31.92 |
| | 79 | 29.42 |
| | 84 | 32.45 |
| | 85 | 32.58 |
| | 87 | 30.49 |
| | 92 | 32.96 |
| | 93 | 33.32 |
| | 94 | 30.85 |
| | 100 | 33.04 |
| | 101 | 33.79 |
| | 102 | 31.32 |
| | 108 | 33.63 |
| | 109 | 34.08 |
| | 110 | 30.21 |
| | 116 | 34.12 |
| | 117 | 34.60 |
| | 118 | 31.66 |
| | 124 | 34.80 |
| | 125 | 34.89 |
| | 126 | 32.05 |
| | 132 | 36.67 |
| | 133 | 35.31 |
| | 134 | 31.99 |
| | 139 | 35.39 |
| | 141 | 35.81 |
| | 142 | 32.51 |
| | 147 | 35.40 |
| | 148 | 36.32 |
| | 150 | 32.70 |
| | 155 | 36.07 |
| | 156 | 36.74 |
| | 157 | 31.85 |
| | 163 | 36.51 |
| | 164 | 37.00 |
| | 165 | 31.63 |
| | 171 | 36.63 |
| | 172 | 37.50 |
| | 173 | 32.63 |
| | 179 | 37.09 |
| | 180 | 37.94 |
| | 181 | 33.01 |
| | 187 | 37.16 |
| | 188 | 38.49 |
| | 189 | 33.06 |
| | 195 | 37.20 |
| | 196 | 38.56 |
| | 197 | 33.15 |
| | 202 | 36.63 |
| | 204 | 38.71 |
| | 205 | 33.56 |
| | 210 | 37.58 |
| | 211 | 38.94 |
| | 213 | 32.75 |
| | 218 | 37.83 |
| | 219 | 39.29 |
| | 220 | 32.95 |
| | 226 | 37.95 |

TABLE 12-continued

OTR of Rewetted Films 1, 2, 3 at 0-140 Hours After Autoclaving (100/85% RH)

| Film | Time (hrs) | OTR (cc/m²/d) |
|---|---|---|
|  | 227 | 39.50 |
|  | 228 | 32.46 |
| 2 | 7 | 2.87 |
|  | 8 | 1.31 |
|  | 11 | 1.80 |
|  | 12 | 1.32 |
|  | 15 | 5.15 |
|  | 16 | 1.53 |
|  | 17 | 1.45 |
|  | 19 | 3.23 |
|  | 20 | 1.44 |
|  | 21 | 1.53 |
|  | 24 | 2.47 |
|  | 25 | 1.36 |
|  | 26 | 1.53 |
|  | 28 | 2.14 |
|  | 29 | 1.24 |
|  | 30 | 1.45 |
|  | 33 | 1.99 |
|  | 34 | 1.23 |
|  | 34 | 1.39 |
|  | 37 | 2.07 |
|  | 38 | 1.88 |
|  | 39 | 1.99 |
|  | 42 | 2.68 |
|  | 43 | 2.87 |
|  | 44 | 3.61 |
|  | 46 | 3.85 |
|  | 47 | 3.63 |
|  | 48 | 4.36 |
|  | 51 | 4.60 |
|  | 52 | 4.26 |
|  | 53 | 5.11 |
|  | 55 | 5.34 |
|  | 56 | 4.88 |
|  | 57 | 5.90 |
|  | 60 | 6.03 |
|  | 61 | 5.43 |
|  | 62 | 6.63 |
|  | 64 | 6.73 |
|  | 65 | 6.05 |
|  | 66 | 7.39 |
|  | 69 | 7.51 |
|  | 70 | 6.67 |
|  | 71 | 8.19 |
|  | 73 | 8.28 |
|  | 74 | 7.32 |
|  | 75 | 8.96 |
|  | 78 | 8.89 |
|  | 79 | 7.91 |
|  | 80 | 9.65 |
|  | 82 | 9.67 |
|  | 83 | 8.59 |
|  | 84 | 10.4 |
|  | 87 | 10.45 |
|  | 88 | 9.19 |
|  | 89 | 11.16 |
|  | 91 | 11.20 |
|  | 92 | 9.82 |
|  | 93 | 12.14 |
|  | 96 | 11.85 |
|  | 97 | 10.61 |
|  | 98 | 13.52 |
|  | 100 | 12.61 |
|  | 101 | 11.02 |
|  | 102 | 13.28 |
|  | 105 | 13.27 |
|  | 106 | 11.85 |
|  | 107 | 14.24 |
|  | 109 | 14.07 |
|  | 110 | 12.35 |
|  | 111 | 14.90 |
|  | 114 | 14.80 |
|  | 115 | 12.95 |
|  | 116 | 15.83 |
|  | 121 | 15.98 |
|  | 122 | 13.91 |
|  | 123 | 16.89 |
|  | 126 | 16.60 |
|  | 127 | 14.43 |
|  | 128 | 17.59 |
|  | 130 | 17.31 |
|  | 131 | 15.17 |
|  | 132 | 18.26 |
|  | 135 | 17.50 |
|  | 136 | 15.72 |
|  | 137 | 18.88 |
|  | 139 | 19.74 |
|  | 140 | 17.10 |
|  | 141 | 16.67 |
|  | 144 | 19.68 |
|  | 145 | 17.07 |
|  | 146 | 20.07 |
|  | 148 | 20.05 |
|  | 149 | 16.82 |
|  | 150 | 20.75 |
|  | 153 | 18.24 |
|  | 154 | 19.01 |
|  | 155 | 21.27 |
|  | 157 | 20.07 |
|  | 158 | 18.53 |
|  | 159 | 22.18 |
|  | 162 | 21.56 |
|  | 163 | 19.77 |
|  | 164 | 23.37 |
|  | 166 | 22.27 |
|  | 167 | 18.71 |
|  | 168 | 22.47 |
|  | 171 | 23.07 |
|  | 172 | 21.57 |
|  | 173 | 24.47 |
|  | 175 | 23.48 |
|  | 176 | 19.05 |
|  | 177 | 23.37 |
|  | 180 | 23.95 |
|  | 181 | 19.69 |
|  | 182 | 24.18 |
|  | 184 | 24.44 |
|  | 185 | 22.48 |
|  | 186 | 27.89 |
|  | 189 | 25.01 |
|  | 190 | 21.74 |
|  | 191 | 24.10 |
|  | 193 | 25.25 |
|  | 194 | 24.65 |
|  | 195 | 27.76 |
|  | 198 | 25.78 |
|  | 199 | 22.97 |
|  | 200 | 24.76 |
|  | 202 | 26.18 |
|  | 203 | 22.52 |
|  | 204 | 28.51 |
|  | 207 | 26.39 |
|  | 208 | 21.40 |
|  | 209 | 27.68 |
|  | 211 | 27.05 |
|  | 212 | 25.81 |
|  | 213 | 27.87 |
|  | 216 | 27.32 |
|  | 217 | 22.06 |
|  | 218 | 28.23 |
|  | 220 | 27.72 |
|  | 221 | 24.00 |
|  | 222 | 28.60 |
|  | 225 | 28.09 |
|  | 226 | 24.10 |
|  | 227 | 28.60 |
|  | 229 | 28.61 |

TABLE 12-continued

OTR of Rewetted Films 1, 2, 3 at 0-140 Hours After Autoclaving (100/85% RH)

| Film | Time (hrs) | OTR (cc/m$^2$/d) |
|---|---|---|
|  | 230 | 24.49 |
|  | 231 | 29.16 |
|  | 234 | 28.68 |
|  | 235 | 24.82 |
|  | 236 | 29.18 |
|  | 238 | 29.08 |
|  | 239 | 25.32 |
|  | 240 | 29.42 |
|  | 243 | 32.06 |
|  | 244 | 25.41 |
|  | 245 | 29.70 |
|  | 247 | 29.98 |
|  | 248 | 25.34 |
|  | 249 | 29.93 |
|  | 252 | 29.63 |
|  | 253 | 25.67 |
|  | 254 | 30.14 |
|  | 256 | 30.27 |
|  | 257 | 27.90 |
|  | 258 | 30.38 |
|  | 261 | 30.40 |
|  | 262 | 27.02 |
|  | 263 | 30.66 |
|  | 265 | 30.73 |
|  | 266 | 26.82 |
|  | 267 | 30.93 |
|  | 270 | 31.25 |
|  | 271 | 26.99 |
|  | 272 | 31.08 |
|  | 274 | 31.27 |
|  | 275 | 26.76 |
|  | 276 | 31.24 |
|  | 279 | 31.58 |
|  | 280 | 27.04 |
|  | 281 | 31.84 |
|  | 283 | 31.60 |
|  | 284 | 27.22 |
|  | 285 | 31.25 |
|  | 288 | 31.83 |
|  | 289 | 27.66 |
|  | 290 | 31.23 |
|  | 292 | 32.20 |
|  | 293 | 27.55 |
|  | 294 | 31.90 |
|  | 297 | 32.24 |
|  | 298 | 27.73 |
|  | 299 | 32.06 |
| 3 | 10 | 0.74 |
|  | 11 | 1.00 |
|  | 12 | 0.86 |
|  | 18 | 0.91 |
|  | 19 | 1.11 |
|  | 20 | 1.10 |
|  | 26 | 1.01 |
|  | 27 | 1.01 |
|  | 28 | 1.25 |
|  | 34 | 1.07 |
|  | 35 | 1.03 |
|  | 36 | 1.65 |
|  | 42 | 1.30 |
|  | 43 | 1.51 |
|  | 44 | 2.53 |
|  | 49 | 2.19 |
|  | 51 | 2.91 |
|  | 52 | 3.85 |
|  | 57 | 3.221 |
|  | 58 | 4.23 |
|  | 60 | 4.94 |
|  | 65 | 4.03 |
|  | 66 | 5.36 |
|  | 67 | 5.80 |
|  | 73 | 4.65 |
|  | 74 | 6.76 |
|  | 75 | 6.55 |
|  | 81 | 5.26 |
|  | 82 | 7.23 |
|  | 83 | 7.47 |
|  | 89 | 5.73 |
|  | 90 | 7.99 |
|  | 91 | 8.13 |
|  | 97 | 6.11 |
|  | 98 | 8.54 |
|  | 99 | 8.63 |
|  | 105 | 6.52 |
|  | 106 | 9.04 |
|  | 107 | 9.07 |
|  | 112 | 7.04 |
|  | 114 | 9.51 |
|  | 115 | 9.51 |
|  | 120 | 7.51 |
|  | 121 | 9.82 |
|  | 123 | 9.79 |
|  | 128 | 7.93 |
|  | 129 | 9.95 |
|  | 130 | 10.16 |
|  | 136 | 8.22 |
|  | 137 | 10.39 |
|  | 138 | 10.28 |
|  | 144 | 8.47 |
|  | 145 | 10.75 |
|  | 146 | 10.57 |
|  | 152 | 8.72 |
|  | 153 | 10.88 |
|  | 154 | 10.78 |
|  | 160 | 8.48 |
|  | 161 | 10.97 |
|  | 162 | 10.96 |
|  | 168 | 8.57 |
|  | 169 | 11.32 |
|  | 170 | 11.10 |
|  | 175 | 8.48 |
|  | 177 | 11.60 |
|  | 178 | 11.26 |
|  | 183 | 8.70 |
|  | 184 | 11.15 |
|  | 186 | 11.37 |
|  | 191 | 8.80 |
|  | 192 | 12.19 |
|  | 193 | 11.44 |
|  | 199 | 8.81 |
|  | 200 | 11.65 |
|  | 201 | 11.55 |
|  | 207 | 8.98 |
|  | 208 | 11.77 |
|  | 209 | 11.59 |
|  | 215 | 9.00 |
|  | 216 | 11.77 |
|  | 217 | 11.66 |
|  | 223 | 9.02 |
|  | 224 | 11.88 |
|  | 225 | 11.73 |
|  | 231 | 9.01 |

Example 5

OTR of Rewetted Autoclaved Films 1, 2, and 3 at 100/100% RH

Films 1, 2, and 3 were autoclaved as in Example 1. After the barrier properties had returned to dry, the films were rewetted. The OTR values for Films 1, 2, and 3 were then determined using Mocon testing, as in Example 1. The post-autoclave shock OTR of rewetted Films 1, 2, and 3 at 100/100% RH was determined.

For Film 1, the initial OTR was above the capabilities of the Mocon instrument, so there is no data because the values are too high. Film 2 (which has a core EVOH barrier layer) exhibited the lowest OTR after rewetting film. Film 3 (which has an EVOH barrier core layer and an EVOH barrier layer directly adjacent to an outer polyamide layer) had an OTR lower than Film 1, but higher than Film 2. The better performance of Film 2 in the 100%/100% RH situation is attributable to the fact that Film 2 has a thick layer (2.72 mills) consisting of 3 sublayers identified as layers 2, 3, and 4 of low moisture permeable material as compared to Film 3, which has only a single layer of 0.65 mils of low moisture permeable material. However, Film 2 would not be suitable since the barrier recovery time for Film 2 would be excessive due to the lack of an EVOH layer immediately adjacent to the polyamide layer.

OTR Data is given in Table 13, below.

TABLE 13

Post Shock Rewetted Data for Films 1, 2, 3 at 100/100% RH

| Film | Time (hrs) | OTR (cc/m$^2$/d) |
|---|---|---|
| 1 | N/D | N/D |
| 2 | 2 | 2.15 |
|   | 3 | 2.03 |
|   | 4 | 1.64 |
|   | 10 | 1.52 |
|   | 11 | 1.96 |
|   | 12 | 1.81 |
|   | 18 | 2.34 |
|   | 19 | 2.47 |
|   | 20 | 2.61 |
|   | 26 | 2.80 |
|   | 27 | 2.65 |
|   | 28 | 3.19 |
|   | 34 | 3.06 |
|   | 35 | 3.54 |
|   | 36 | 4.06 |
|   | 42 | 7.19 |
|   | 43 | 6.77 |
|   | 44 | 7.19 |
|   | 49 | 10.41 |
|   | 51 | 9.28 |
|   | 52 | 10.14 |
|   | 57 | 13.88 |
|   | 58 | 11.96 |
|   | 60 | 13.26 |
|   | 65 | 18.28 |
|   | 66 | 14.91 |
|   | 67 | 16.37 |
|   | 73 | 22.03 |
|   | 74 | 18.01 |
|   | 75 | 19.89 |
|   | 81 | 26.34 |
|   | 82 | 22.12 |
|   | 83 | 24.36 |
|   | 89 | 31.56 |
|   | 90 | 25.20 |
|   | 91 | 27.64 |
|   | 97 | 37.64 |
|   | 98 | 29.37 |
|   | 99 | 31.51 |
|   | 105 | 39.90 |
|   | 106 | 32.56 |
|   | 107 | 34.62 |
|   | 112 | 47.83 |
|   | 114 | 36.16 |
|   | 115 | 39.08 |
|   | 120 | 50.19 |
|   | 121 | 39.98 |
|   | 123 | 42.79 |
|   | 128 | 55.05 |
|   | 129 | 43.48 |
|   | 130 | 47.08 |
|   | 136 | 59.80 |
|   | 137 | 47.56 |
|   | 138 | 51.28 |
|   | 144 | 65.12 |
|   | 145 | 51.85 |
|   | 146 | 56.48 |
|   | 152 | 70.02 |
|   | 153 | 54.85 |
|   | 154 | 60.35 |
|   | 160 | 75.70 |
|   | 161 | 58.85 |
|   | 162 | 64.62 |
|   | 168 | 80.09 |
|   | 169 | 63.04 |
|   | 170 | 68.92 |
|   | 175 | 85.45 |
|   | 177 | 66.37 |
|   | 178 | 72.64 |
|   | 183 | 89.08 |
|   | 184 | 70.01 |
|   | 186 | 76.89 |
|   | 191 | 95.15 |
|   | 192 | 73.40 |
|   | 193 | 81.02 |
|   | 199 | 102.18 |
|   | 200 | 77.92 |
|   | 201 | 84.98 |
|   | 207 | 104.5 |
|   | 208 | 81.97 |
|   | 209 | 90.11 |
|   | 215 | 109.02 |
|   | 216 | 85.18 |
|   | 217 | 92.83 |
|   | 223 | 114.36 |
|   | 224 | 89.08 |
|   | 225 | 98.80 |
|   | 231 | 117.66 |
|   | 232 | 93.15 |
|   | 233 | 101.16 |
|   | 238 | 122.64 |
|   | 239 | 95.42 |
|   | 241 | 104.49 |
|   | 246 | 127.31 |
|   | 247 | 99.37 |
|   | 248 | 105.59 |
|   | 254 | 132.36 |
|   | 255 | 102.72 |
|   | 256 | 113.01 |
|   | 262 | 133.86 |
|   | 263 | 104.16 |
|   | 264 | 116.00 |
|   | 270 | 138.34 |
|   | 271 | 109.89 |
|   | 272 | 119.70 |
|   | 278 | 143.66 |
|   | 279 | 113.27 |
|   | 280 | 122.96 |
|   | 286 | 147.52 |
|   | 287 | 116.36 |
|   | 288 | 126.59 |
|   | 294 | 152.66 |
|   | 295 | 119.98 |
|   | 296 | 129.68 |
| 3 | 6 | 1.98 |
|   | 7 | 2.38 |
|   | 8 | 1.79 |
|   | 13 | 3.03 |
|   | 15 | 3.46 |
|   | 16 | 3.22 |
|   | 21 | 5.40 |
|   | 22 | 6.29 |
|   | 24 | 5.18 |
|   | 29 | 7.50 |
|   | 30 | 9.23 |
|   | 31 | 6.57 |

TABLE 13-continued

Post Shock Rewetted Data for Films 1, 2, 3 at 100/100% RH

| Film | Time (hrs) | OTR (cc/m²/d) |
|---|---|---|
| | 37 | 10.93 |
| | 38 | 13.51 |
| | 39 | 12.74 |
| | 45 | 17.40 |
| | 46 | 21.40 |
| | 47 | 18.25 |
| | 53 | 24.47 |
| | 54 | 28.15 |
| | 55 | 25.11 |
| | 61 | 30.76 |
| | 62 | 35.69 |
| | 63 | 31.05 |
| | 69 | 37.75 |
| | 70 | 43.44 |
| | 71 | 37.48 |
| | 76 | 43.10 |
| | 78 | 50.40 |
| | 79 | 44.96 |
| | 84 | 50.91 |
| | 85 | 57.78 |
| | 87 | 50.91 |
| | 92 | 57.48 |
| | 93 | 64.46 |
| | 94 | 56.70 |
| | 100 | 63.46 |
| | 101 | 72.72 |
| | 102 | 63.09 |
| | 108 | 70.34 |
| | 109 | 79.45 |
| | 110 | 69.77 |
| | 116 | 76.14 |
| | 117 | 85.73 |
| | 118 | 79.50 |
| | 124 | 81.74 |
| | 125 | 92.04 |
| | 126 | 80.85 |
| | 132 | 86.23 |
| | 133 | 98.47 |
| | 134 | 86.80 |
| | 139 | 91.89 |
| | 141 | 103.54 |
| | 142 | 91.15 |
| | 147 | 95.36 |
| | 148 | 110.77 |
| | 150 | 97.66 |
| | 155 | 101.76 |
| | 156 | 116.63 |
| | 157 | 101.61 |
| | 163 | 106.24 |
| | 164 | 120.04 |
| | 165 | 106.61 |
| | 171 | 111.52 |
| | 172 | 125.27 |
| | 173 | 112.70 |
| | 179 | 115.29 |
| | 180 | 124.40 |
| | 181 | 117.65 |
| | 187 | 117.72 |
| | 188 | 133.07 |
| | 189 | 127.88 |
| | 195 | 122.92 |
| | 196 | 139.06 |
| | 197 | 125.06 |
| | 202 | 126.73 |
| | 204 | 141.67 |
| | 205 | 129.04 |
| | 210 | 130.55 |
| | 211 | 145.24 |
| | 213 | 133.08 |
| | 218 | 134.03 |
| | 219 | 150.00 |
| | 220 | 138.48 |
| | 226 | 135.31 |
| | 227 | 154.23 |
| | 228 | 140.65 |
| | 234 | 138.81 |
| | 235 | 153.99 |
| | 236 | 142.14 |
| | 242 | 140.86 |
| | 243 | 159.25 |
| | 244 | 144.69 |
| | 250 | 145.04 |
| | 251 | 161.93 |
| | 252 | 151.29 |
| | 258 | 146.02 |
| | 259 | 164.84 |
| | 260 | 155.59 |
| | 265 | 148.57 |
| | 266 | 168.28 |
| | 268 | 158.64 |
| | 273 | 152.02 |
| | 274 | 170.58 |
| | 275 | 161.40 |

What is claimed is:

1. A method of packaging an oxygen sensitive product, the method comprising:
    a. providing a film comprising:
        i. a first layer comprising a high permeable material having a moisture vapor permeability greater than about 40 g-mil/100 in²-day-atm;
        ii. a second layer directly adjacent to the first layer comprising EVOH;
        iii. a first region defining a third layer in direct contact with the second layer comprising 1 to 5 distinct sublayers comprising low permeable materials having moisture vapor permeability of less than about 20 g-mil/100 in²-day-atm;
        iv. a fourth layer comprising EVOH;
        v. a second region defining a fifth layer in direct contact with the fourth layer comprising 1 to 5 sublayers comprising very low permeable materials having a moisture vapor transmission rate of less than about 5 g/100 in²-day-atm;
    b. forming the film into a pouch;
    c. filling the pouch with an oxygen sensitive product;
    d. sealing the pouch; and
    e. subjecting the packaged product to autoclave conditions.

2. The method of claim 1, wherein the first layer of said film comprises at least one member selected from the group consisting of: a polyamide, an elastomeric copolyamide, and a polyether polyamide block copolymer.

3. The method of claim 2, wherein the polyamide is selected from the group consisting of: nylon 6, nylon 7, nylon 8, nylon 9, nylon 10, nylon 2, nylon 11, nylon 12, nylon 66, nylon 69, nylon 610, nylon 611, nylon 612, nylon 6/12, nylon 6/69, nylon 66/610, nylon 6/66, nylon 66/6, nylon 12T, nylon 6T, and combinations thereof.

4. The method of claim 2, wherein the elastomeric copolyamide is selected from the group consisting of: copolymers of a polyamide and a polyetheramine, copolymers of nylon 12 and a polyetheramine, and copolymers of nylon 69 and a polyetheramine.

5. The method of claim 1, wherein the EVOH of the second and fourth layers comprises an ethylene content of between about 28 mol % and about 48 mol %.

6. The method of claim 1, wherein at least one of the layers of the first and second region in direct contact with the second or fourth layer comprises a polymeric adhesive selected from the group consisting of anhydride grafted ethylene/1-butene copolymer, anhydride grafted ethylene/1-hexene copolymer, polypropylene, propylene ethylene copolymer, ethylene vinyl acetate copolymer, ethylene methyl acrylate copolymer, and anhydride grafted ethylene/1-octene copolymer.

7. The method of claim 1, wherein at least one layer of the first or second region comprises a polymer selected from the group consisting of: ethylene alpha olefin copolymer, high density polyethylene, polypropylene, polypropylene ethylene copolymer, and cyclo-olefin copolymer.

8. The method of claim 1, wherein the oxygen sensitive product is a medical product.

* * * * *